(12) United States Patent
Yamada et al.

(10) Patent No.: US 12,314,211 B2
(45) Date of Patent: May 27, 2025

(54) COMMUNICATION DEVICE AND COMMUNICATION SYSTEM

(71) Applicant: Sony Semiconductor Solutions Corporation, Kanagawa (JP)

(72) Inventors: Junya Yamada, Kanagawa (JP); Toshihisa Hyakudai, San Diego, CA (US); Satoshi Ota, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 24 days.

(21) Appl. No.: 18/320,662

(22) Filed: May 19, 2023

(65) Prior Publication Data

US 2023/0385225 A1 Nov. 30, 2023

Related U.S. Application Data

(60) Provisional application No. 63/345,285, filed on May 24, 2022.

(51) Int. Cl.
*G06F 13/42* (2006.01)
*H04L 69/22* (2022.01)

(52) U.S. Cl.
CPC .......... *G06F 13/4282* (2013.01); *H04L 69/22* (2013.01); *G06F 2213/0016* (2013.01)

(58) Field of Classification Search
CPC ......... G06F 13/4282; G06F 2213/0016; H04L 69/22
See application file for complete search history.

(56) References Cited

U.S. PATENT DOCUMENTS 6,333,938 B1 * 12/2001 Baker .............. H04N 21/43632
375/E7.278
2002/0089963 A1 * 7/2002 Kang ...................... H04W 8/26
370/340

(Continued)

FOREIGN PATENT DOCUMENTS

JP 2011-239011 A 11/2011
WO WO-2021187320 A1 9/2021
WO WO-2021261223 A1 12/2021

OTHER PUBLICATIONS

Dalmia, Kamal, "ASA MotionLink—Tutorial", Sep. 29, 2021, Aviva links, https://auto-serdes.org/wp-content/uploads/2022/08/ASA-tutorial-Sep-2021.pdf (Year: 2021).*

*Primary Examiner* — Henry Tsai
*Assistant Examiner* — Aurangzeb Hassan
(74) *Attorney, Agent, or Firm* — Michael Best & Friedrich LLP

(57) ABSTRACT

The memory capacity for storing address information etc. of an I2C communication instrument, as well as the number of encoders and decoders can be reduced.

A communication device to establish communication between a first I2C communication instrument and a second I2C communication instrument connected to a communication partner device, includes: an encoder that generates Header Packet Data including a target ID of the communication partner device and I2C Packet Data including a slave address and an offset address of the second I2C communication instrument; a communication unit that transmits a transmission packet including the Header Packet Data and the I2C Packet Data generated by the encoder to the communication partner device by a TDD communication scheme and receives a reception packet from the commu- (Continued)

nication partner device by the TDD communication scheme; and a decoder that generates the I2C Packet Data from the reception packet.

15 Claims, 36 Drawing Sheets

(56) References Cited

U.S. PATENT DOCUMENTS

| | | | |
|---|---|---|---|
| 2005/0210176 A1* | 9/2005 | Zarns | H04L 9/40 |
| | | | 710/315 |
| 2019/0349426 A1* | 11/2019 | Smith | H04W 4/70 |
| 2020/0042470 A1* | 2/2020 | Lee | G06F 3/0604 |
| 2020/0076713 A1* | 3/2020 | Meyer | H04L 69/22 |
| 2021/0232516 A1 | 7/2021 | Dalmia | |

* cited by examiner

1: COMMUNICATIONS SYSTEM

1: COMMUNICATIONS SYSTEM

1: COMMUNICATIONS SYSTEM

1: COMMUNICATIONS SYSTEM

1: COMMUNICATIONS SYSTEM

1: COMMUNICATIONS SYSTEM

1: COMMUNICATIONS SYSTEM

1: COMMUNICATIONS SYSTEM

1: COMMUNICATIONS SYSTEM

1: COMMUNICATIONS SYSTEM

1: COMMUNICATIONS SYSTEM

1: COMMUNICATIONS SYSTEM

1: COMMUNICATIONS SYSTEM

1: COMMUNICATIONS SYSTEM

FIG. 24

ASEP Reg
Adr:7'h21 ~140

| Offset Address | [15] | [14] | [13] | [12] | [11] | [10] | [9] | [8] | [7] | [6] | [5] | [4] | [3] | [2] | [1] | [0] |
|---|---|---|---|---|---|---|---|---|---|---|---|---|---|---|---|---|
| 209 | en flag | Reserved | | | target ID2 | | | | en flag | Reserved | | | target ID1 | | | |
| 210 | en flag | Reserved | | | target ID4 | | | | en flag | Reserved | | | target ID3 | | | | en flag: (0) disable, (1) enable

I2C Address Register (Root node)

FIG. 25

Target Code

| target code[3:0] | target ID4 | target ID3 | target ID2 | target ID1 |
|---|---|---|---|---|
| 0000 | | | | |
| 0001 | | | | enable |
| 0010 | | | enable | |
| 0011 | | | enable | enable |
| 0100 | | enable | | |
| 0101 | | enable | | enable |
| 0110 | | enable | enable | |
| 0111 | | enable | enable | enable |
| 1000 | enable | | | |
| 1001 | enable | | | enable |
| 1010 | enable | | enable | |
| 1011 | enable | | enable | enable |
| 1100 | enable | enable | | |
| 1101 | enable | enable | | enable |
| 1110 | enable | enable | enable | |
| 1111 | enable | enable | enable | enable |

(0) disable, (1) enable

1: COMMUNICATIONS SYSTEM

1: COMMUNICATIONS SYSTEM

1: COMMUNICATIONS SYSTEM

1: COMMUNICATIONS SYSTEM

FIG. 33

| Offset Address | [15] | [14] | [13] | [12] | [11] | [10] | [9] | [8] | [7] | [6] | [5] | [4] | [3] | [2] | [1] | [0] |
|---|---|---|---|---|---|---|---|---|---|---|---|---|---|---|---|---|
| 209 | en flag | Reserved | | target ID2 of Group#0 | | | | | en flag | Reserved | | | target ID1 of Group#0 | | | |
| 210 | en flag | Reserved | | target ID4 of Group#0 | | | | | en flag | Reserved | | | target ID3 of Group#0 | | | |
| 211 | en flag | Reserved | | target ID2 of Group#1 | | | | | en flag | Reserved | | | target ID1 of Group#1 | | | |
| 212 | en flag | Reserved | | target ID4 of Group#1 | | | | | en flag | Reserved | | | target ID3 of Group#1 | | | |

ASEP Reg Adr:7'h21 ~140 en flag: (0) disable, (1) enable

I2C Address Register (Root node)

FIG. 34

Target Code

| target code[7:0] Group # | [3:0] | target ID4 | target ID3 | target ID2 | target ID1 |
|---|---|---|---|---|---|
| 0000 | 0000 | | | | |
| 0000 | 0001 | | | | enable |
| 0000 | 0010 | | | enable | |
| 0000 | 0011 | | | enable | enable |
| 0000 | 0100 | | enable | | |
| 0000 | 0101 | | enable | | enable |
| 0000 | 0110 | | enable | enable | |
| 0000 | 0111 | | enable | enable | enable |
| 0000 | 1000 | enable | | | |
| 0000 | 1001 | enable | | | enable |
| 0000 | 1010 | enable | | enable | |
| 0000 | 1011 | enable | | enable | enable |
| 0000 | 1100 | enable | enable | | |
| 0000 | 1101 | enable | enable | | enable |
| 0000 | 1110 | enable | enable | enable | |
| 0000 | 1111 | enable | enable | enable | enable |
| 0001 | 0000 | | | | |
| 0001 | 0001 | | | | enable |
| 0001 | 0010 | | | enable | |
| 0001 | 0011 | | | enable | enable |
| 0001 | 0100 | | enable | | |
| 0001 | 0101 | | enable | | enable |
| 0001 | 0110 | | enable | enable | |
| 0001 | 0111 | | enable | enable | enable |
| 0001 | 1000 | enable | | | |
| 0001 | 1001 | enable | | | enable |
| 0001 | 1010 | enable | | enable | |
| 0001 | 1011 | enable | | enable | enable |
| 0001 | 1100 | enable | enable | | |
| 0001 | 1101 | enable | enable | | enable |
| 0001 | 1110 | enable | enable | enable | |
| 0001 | 1111 | enable | enable | enable | enable |

(0) disable, (1) enable

FIG. 36

| ASEP Reg |
|----------|
| Adr:7'h21 ~140 |

| Offset Address | [15] | [14] | [13] | [12] | [11] | [10] | [9] | [8] | [7] | [6] | [5] | [4] | [3] | [2] | [1] | [0] | |
|---|---|---|---|---|---|---|---|---|---|---|---|---|---|---|---|---|---|
| 209 | 1 | Reserved | | ASA node#4 (5'h04) | | | | | 1 | Reserved | | ASA node#2 (5'h02) | | | | | } Group#0 (target code[7:4]=4'h0) |
| 210 | 1 | Reserved | | ASA node#9 (5'h09) | | | | | 1 | Reserved | | ASA node#7 (5'h07) | | | | | |
| 211 | 1 | Reserved | | ASA node#5 (5'h05) | | | | | 0 | Reserved | | ASA node#9 (5'h09) | | | | | } Group#1 (target code[7:4]=4'h1) |
| 212 | 0 | Reserved | | target ID4 of Group#1 | | | | | | | | target ID3 of Group#1 | | | | | | en flag: (0) disable, (1) enable

I2C Address Register of Fig36

COMMUNICATION DEVICE AND COMMUNICATION SYSTEM

CROSS REFERENCE TO RELATED APPLICATIONS

This application claims the benefit of U.S. Priority Patent Application No. 63/345,285 filed on May 24, 2022, the entire contents of which are incorporated herein by reference.

TECHNICAL FIELD

The present disclosure relates to a communication device and a communication system.

BACKGROUND ART

A technique for establishing high-speed serial communication among a plurality of devices has been proposed (Patent Literature 1). This type of high-speed serial communication is used in various fields, and is used for communication between in-vehicle devices, for example.

CITATION LIST

Patent Literature

[PTL 1]
JP 2011-239011A

SUMMARY

Technical Problem

With the development of automated driving technology and electronic technology, there is an increasing need for high-speed communication between in-vehicle devices. The Automotive SerDes Alliance (ASA) assumes that high-speed serial communication is established through a Time Division Duplexing (TDD) communication scheme between a Root (100) connected to a cable (hereinafter, simply referred to as Root (100)) and a Leaf device (hereinafter, simply referred to as Leaf).

For example, a conceivable configuration of a communication system allows the Root (100) to perform I2C communication with a CPU (110), and allows the Leaf to perform I2C communication with a camera, and allows the Root (100) and the Leaf to perform high-speed serial communication in compliance with the ASA standards.

In a case where a plurality of I2C communication instruments is connected to the Leaf, the Root (100) may include an encoder and a decoder for each I2C communication instrument so that high-speed serial communication can be established between the Root (100) and the Leaf, and I2C communication can be established with a plurality of I2C communication instruments connected to the Leaf.

However, providing a plurality of encoders and decoders for each Leaf increases the scale of the Root (100). In addition, it is necessary to secure a memory space which stores therein data to be transmitted and received for each Leaf in Root (100), and as the number of connected Leaves increases, the memory capacity increases.

Therefore, the present disclosure provides a communication device and a communication system that do not need to increase the memory capacity for storing data transmitted and received for each Leaf and do not need to increase the number of encoders and decoders even if the number of Leaves connected to the Root increases.

Solution to Problem

According to an embodiment of the present disclosure, the present disclosure provides a communication device configured to cause a first I2C communication instrument and a second I2C communication instrument connected to a communication partner device to establish communication therebetween, the communication device including: an encoder that generates Header Packet Data including a target ID of the communication partner device and I2C Packet Data including a slave address and an offset address of the second I2C communication instrument; a communication unit that transmits a transmission packet including the Header Packet Data and the I2C Packet Data generated by the encoder to the communication partner device by a Time Division Duplex (TDD) communication scheme and receives a reception packet from the communication partner device by the TDD communication scheme; and a decoder that generates the I2C Packet Data from the reception packet.

The Header Packet Data may include a plurality of the target IDs corresponding to a plurality of the communication partner devices.

A memory space which stores therein the Header Packet Data and the I2C Packet Data may include a memory space for communication with the communication partner device.

The Header Packet Data may include four of the target IDs compliant with Automotive SerDes Alliance (ASA) standards.

The encoder and the decoder may be provided so as to be shared by the plurality of the communication partner devices corresponding to the plurality of the target IDs.

A memory which stores therein the Header Packet Data and the I2C Packet Data may have a plurality of memory spaces each having a fixed length to store therein the plurality of the target IDs included in the Header Packet Data, and an invalid ID may be stored in the memory space corresponding to the target ID that is unused.

The Header Packet Data may include variable-length data which includes information indicating the number of the target IDs that are valid, and in which the target IDs that are valid are arranged after the information.

The Header Packet Data may include a target code which specifies a combination of the plurality of the target IDs.

The target code may include bit-string data having a fixed length.

The target code may include 4-bit data and specify a combination of four of the target IDs.

A memory which stores therein the Header Packet Data and the I2C Packet Data may store, as the I2C Packet Data, at least either one of I2C Configuration Data including an operation setting of the second I2C communication instrument or I2C Data for the second I2C communication instrument.

The present disclosure provides a communication system including:
  a first communication device to which a first I2C communication instrument is connected; and
  a second communication device to which a second I2C communication instrument is connected, and which alternately transmits and receives information within an allocated period to and from the first communication device by a Time Division Duplex (TDD) communication scheme, in which the first communication device includes
a first encoder that generates Header Packet Data including a target ID of the second communication device and I2C Packet Data including a slave address and an offset address of the second I2C communication instrument,
a communication unit that transmits a transmission packet including the Header Packet Data and the I2C Packet Data generated by the first encoder to the second communication device by a Time Division Duplex (TDD) communication scheme and receives a reception packet from the second communication device by the TDD communication scheme; and
a first decoder that generates the I2C Packet Data from the reception packet.

The second communication device may include:
a second encoder that generates Header Packet Data including a target ID of the first communication device and I2C Packet Data including a slave address and an offset address of the first I2C communication instrument; a communication unit that transmits a transmission packet including the Header Packet Data and the I2C Packet Data generated by the second encoder to the first communication device by a Time Division Duplex (TDD) communication scheme and receives a reception packet from the first communication device by the TDD communication scheme; and
a second decoder that generates the I2C Packet Data from the reception packet.

The second I2C communication instrument may further include an I2C Slave unit to which an I2C Master unit is connected via an I2C bus.

A plurality of the second communication devices may be connected by a daisy chain, and the Header Packet Data may be divided into a plurality of Groups, and each Group may include a plurality of the target IDs compliant with Automotive SerDes Alliance (ASA) standards.

A plurality of the second communication devices may be connected by a daisy chain, and
the Header Packet Data may include a Group number indicating a Group and a bit string that specifies a combination of a plurality of the target IDs.

The present disclosure provides a communication device configured to cause a first I2C communication instrument and a second I2C communication instrument to establish communication therebetween on the basis of I2C Configuration Data transmitted from a communication partner device to which the first I2C communication instrument is connected, the communication device including:
an encoder that generates Header Packet Data including a target ID of the communication partner device and I2C Packet Data including a slave address and an offset address of the first I2C communication instrument;
a communication unit that transmits a transmission packet including the Header Packet Data and the I2C Packet Data generated by the encoder to the communication partner device by a Time Division Duplex (TDD) communication scheme and receives a reception packet from the communication partner device by the TDD communication scheme; and
a decoder that generates the I2C Packet Data from the reception packet, in which
the second I2C communication instrument further includes an I2C Slave unit to which an I2C Master unit is connected via an I2C bus.

BRIEF DESCRIPTION OF DRAWINGS

FIG. 24 is a diagram illustrating a part of information stored in an ASEP Register of a Root according to a second embodiment.

FIG. 25 is a diagram illustrating a correspondence relation between a target code and a target ID.

FIG. 33 is a diagram illustrating a part of information stored in an ASEP Register of a Leaf according to a third embodiment.

FIG. 34 is a diagram illustrating a correspondence relation between a Group number, a target code, and a target ID.

FIG. 36 is a diagram illustrating an I2C Address Register corresponding to the configuration of FIG. 35.

DESCRIPTION OF EMBODIMENTS

Hereinafter, embodiments of a communication device and a communication system will be described with reference to the drawings. Although main components of the communication device and the communication system will be mainly described below, the communication device and the communication system may have components and functions that are not illustrated or described. The following description does not exclude components and functions that are not illustrated or described.

(Basic Mode of Communication System)

Figure 1:
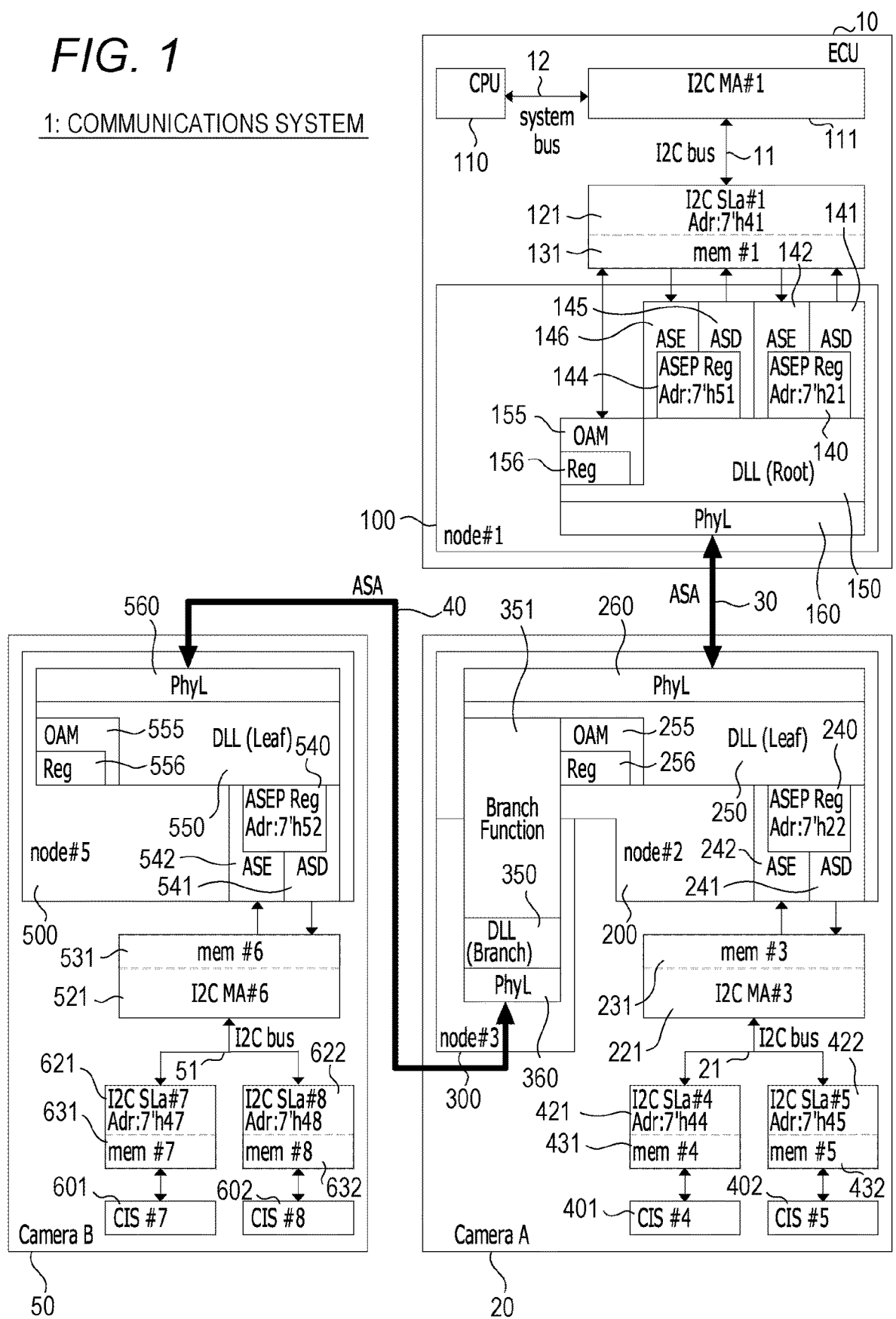
FIG. 1 is a block diagram illustrating a schematic configuration of a communication system according to the present disclosure.

FIG. 1 is a block diagram illustrating a schematic configuration of a communication system according to the present disclosure. The communication system illustrated in FIG. 1 is an in-vehicle communication system, and includes an ECU (10) and two Camera A (20) and Camera B (40) connected by a daisy chain.

The ECU (10) includes a CPU (110), an I2C MASTER #1 (111), an I2C SLAVE #1 (121), an Internal Memory (mem #1 (131)), and a DLL (Root) (150). A Root (100) includes a plurality of encoders (ASEs (142, 146)), a plurality of decoders (ASDs (141, 145)), an ASEP Register (ASEP Regs (140) (144)), a DLL (150), and a PhyL (160).

The Camera A (20) includes a DLL (Leaf) (250), an I2C MASTER #3 (221), an Internal Memory (mem #3) (231), an ASA node #2 (200), a CMOS Image sensor (CIS) #4 (401), an Internal Memory (mem #4) (431), an I2C SLAVE #4 (421), a CMOS Image sensor (CIS) #5 (402), an Internal Memory (mem #5) (432), and an I2C SLAVE #5 (422).

A Leaf (200) includes an ASEP Register (ASEP Reg (240)), an encoder (ASE (242)), a decoder (ASD (241)), a DLL (250), an OAM (255), a Register (Reg (256)), and a PhyL (260). An ASA node #3 (300) includes a DLL (350), a Branch Function (351), and a PhyL (360).

The Camera B (40) includes a Leaf (500), an I2C MASTER #6, an Internal Memory (mem #6), a CMOS Image sensor (CIS) #7, an Internal Memory (mem #7), an I2C SLAVE #7, a CMOS Image sensor (CIS) #8, an Internal Memory (mem #8), and an I2C SLAVE #8.

A Leaf (500) includes an ASEP Register (ASEP Reg (540)), an encoder (ASE (542)), a decoder (ASD (541)), a DLL (550), an OAM (555), a Register (Reg (556)), and a PhyL (560).

As illustrated in FIG. 1, the communication system according to the present disclosure includes the Root (100) and the Leaf (200) (500) that perform high-speed serial communication in conformity with the ASA standards. Hereinafter, the Root (100) may be referred to as node #1, the Leaf (200) may be referred to as node #2, and the Leaf (500) may be referred to as node #5.

I2C Configuration Data is written in the ASEP Register (240) in the Leaf (200) and the ASEP Register (540) in node 5 (500) before I2C communication starts. The I2C Configuration Data includes an I2C CLK rate indicating an operation speed of the I2C bus, Slave Addresses to be managed, and flag information indicating a relation among Offset Address lengths handled by the Slave Addresses.

Figure 2:
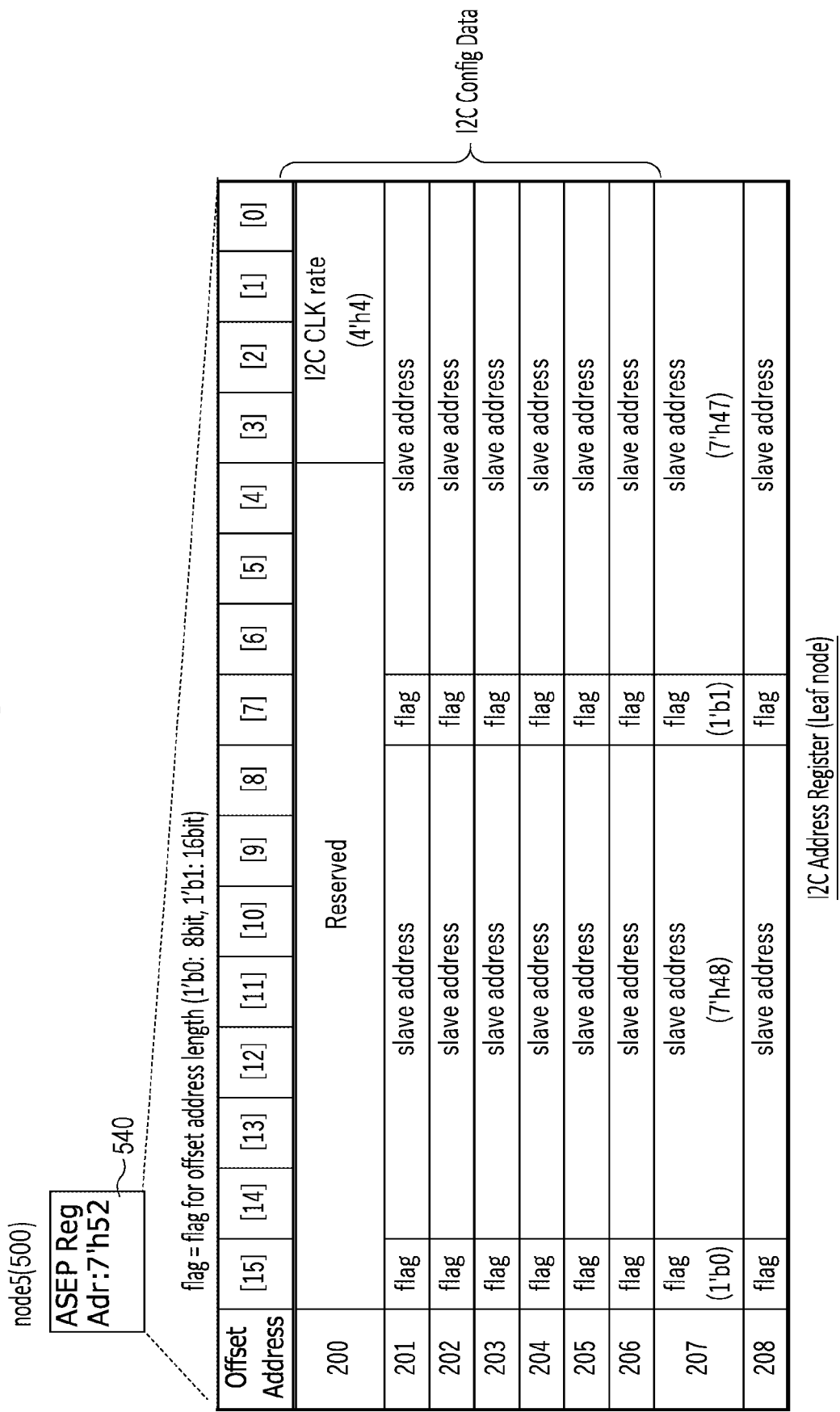
FIG. 2 is a diagram illustrating information stored in an ASEP Register of a Leaf.

FIG. 2 is a diagram illustrating information stored in the ASEP Register (I2C Address Register) (540) in the Leaf (500). In FIG. 2, a Slave Address (7'h52) is assigned to the ASEP Register (540). An Offset Address (200) stores therein a value (4'h4) indicating an I2C CLK rate (400 kHz) at which the I2C bus (51) should operate, and an Offset Address (207) stores therein a Slave address (7'h47) that is a Slave Address managed by an ASA node 5 (500), flag information indicating that the offset address is 16 bits, and flag information (1'b0) indicating that the Slave address (7'h48) and the offset address are 8 bits, together.

In an ASA V1.01, the CPU (110) in the ECU (10) gains access to the Internal Memory #1 (131) via the I2C Master (111) and the I2C Slave (121). The Internal Memory #1 (131) is a memory map divided into a plurality of address regions, and the respective address regions can access different blocks.

Figure 3:
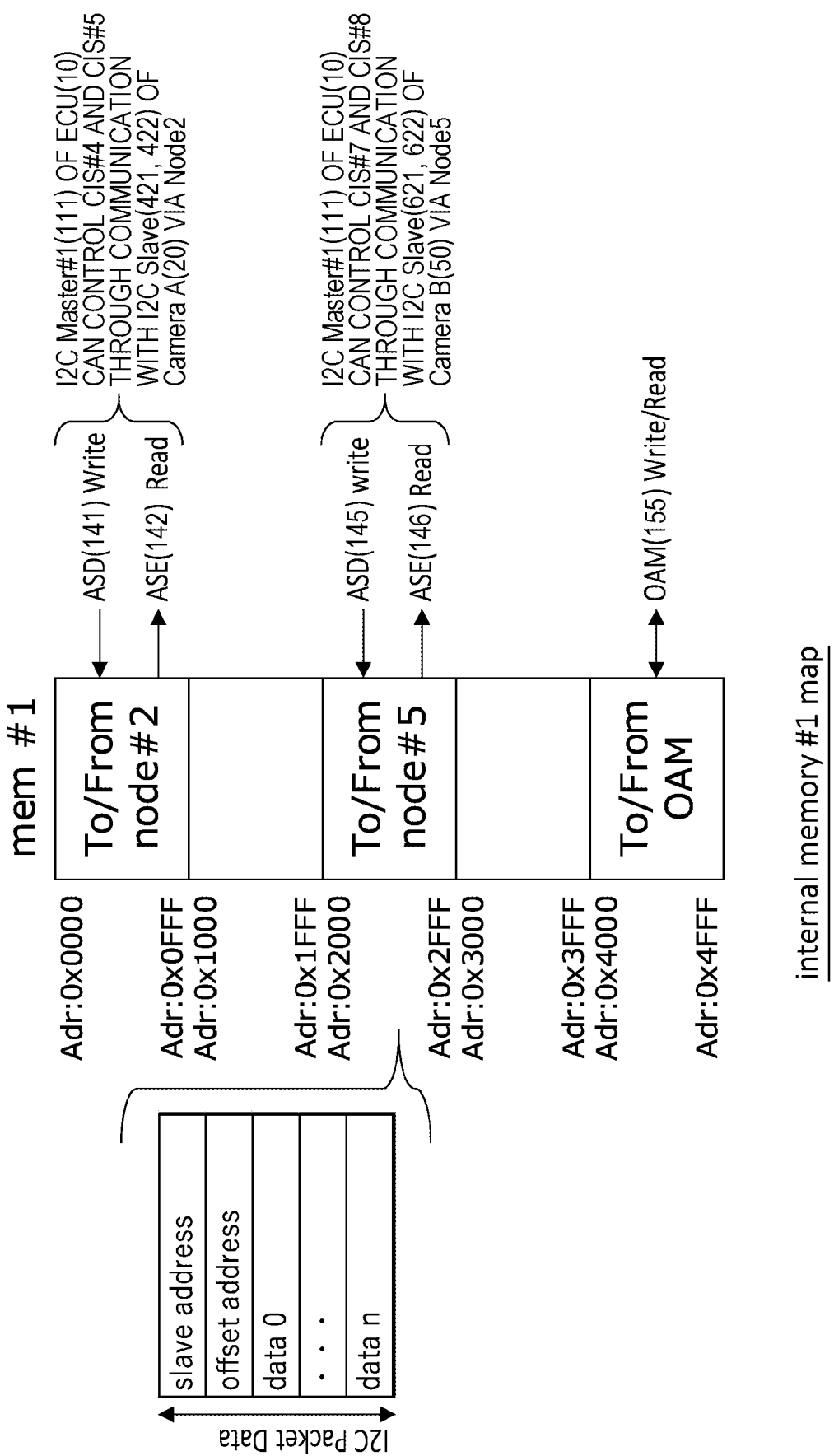
FIG. 3 is a diagram illustrating a memory map of an Internal Memory in FIG. 1.

FIG. 3 is a diagram illustrating a memory map of the Internal Memory (mem #1) in FIG. 1. As illustrated in FIG. 3, the I2C MASTER #1 (111) writes I2C Packet Data that is a source of the I2C Packet in the respective address regions of the Internal Memory #1 (131).

Therefore, the relation between the node (ASA node #2, ASA node #5) of the Leaf (200) (500) and the Slave address under the control thereof are configured to be managed in the address region of the Internal Memory #1 (131).

In an example in FIG. 3, an address region ((0x0000-0xFFF) is a region where a communication to the ASA node #2 (200) is performed, and an address region (0x2000-0x2FFF) is a region where a communication to the ASA node #5 (500) is performed.

The ASD (141) and the ASE (142) perform the I2C communication with the ASA node #2 (200) using the address region (0x0000-0xFFF). The ASD (145) and the ASE (146) perform the I2C communication with the ASA node #5 (500) using the address region (0x2000-2xFFF). In addition, an OAM (155) uses an address region (0x4000-0x4FFF).

FIGS. 4 to 13 are explanatory diagrams illustrating processing operations of the information processing device according to a basic mode of the present disclosure. FIGS. 4 to 13 illustrate Step 1 to Step 16, in the execution order, of the processing in the information processing device.

As illustrated in FIG. 3, since the I2C MASTER #1 (111) should divide the address region of the Internal Memory #1 (131) for each ASA node that is a transmission destination before use, the utilization efficiency of the Internal Memory #1 (131) deteriorates. For example, there is a problem that the amount of transmission data to be transmitted at once by the I2C is restricted by the address region allocated in the Internal Memory #1 (131), and thus, it is difficult to effectively use a memory space.

In addition, as illustrated in FIG. 3, an ASE/ASD of the ASA node corresponding to each address region in the Internal Memory #1 (131) needs to be provided, and there is a problem that the number of circuits of the root (100) that is the ASA node #1 increases.

In an ASA Draft V1.01, the CPU (110) in the ECU (10) gains access to the Internal Memory #1 (131) via the I2C Master (111) and the I2C Slave (121). As illustrated in FIG. 3, the Internal Memory #1 (131) is a memory map divided into a plurality of address regions, and the respective address regions can access different blocks.

For example, in a case where the ECU (10) transmits control data of the CIS #7 (601) built into the Camera B (50) to the Internal memory #7 (631) through the I2C communication, the CPU (110) firstly needs to write I2C Configuration Data including the I2C CLK rate of the I2C bus (51) of the Camera B (50) and the Slave Address handled by the ASA node #5 (500) and having an offset address length of a flag (8 bits/16 bits), in the ASEP Register (540) as illustrated in FIG. 2.

Figure 14:
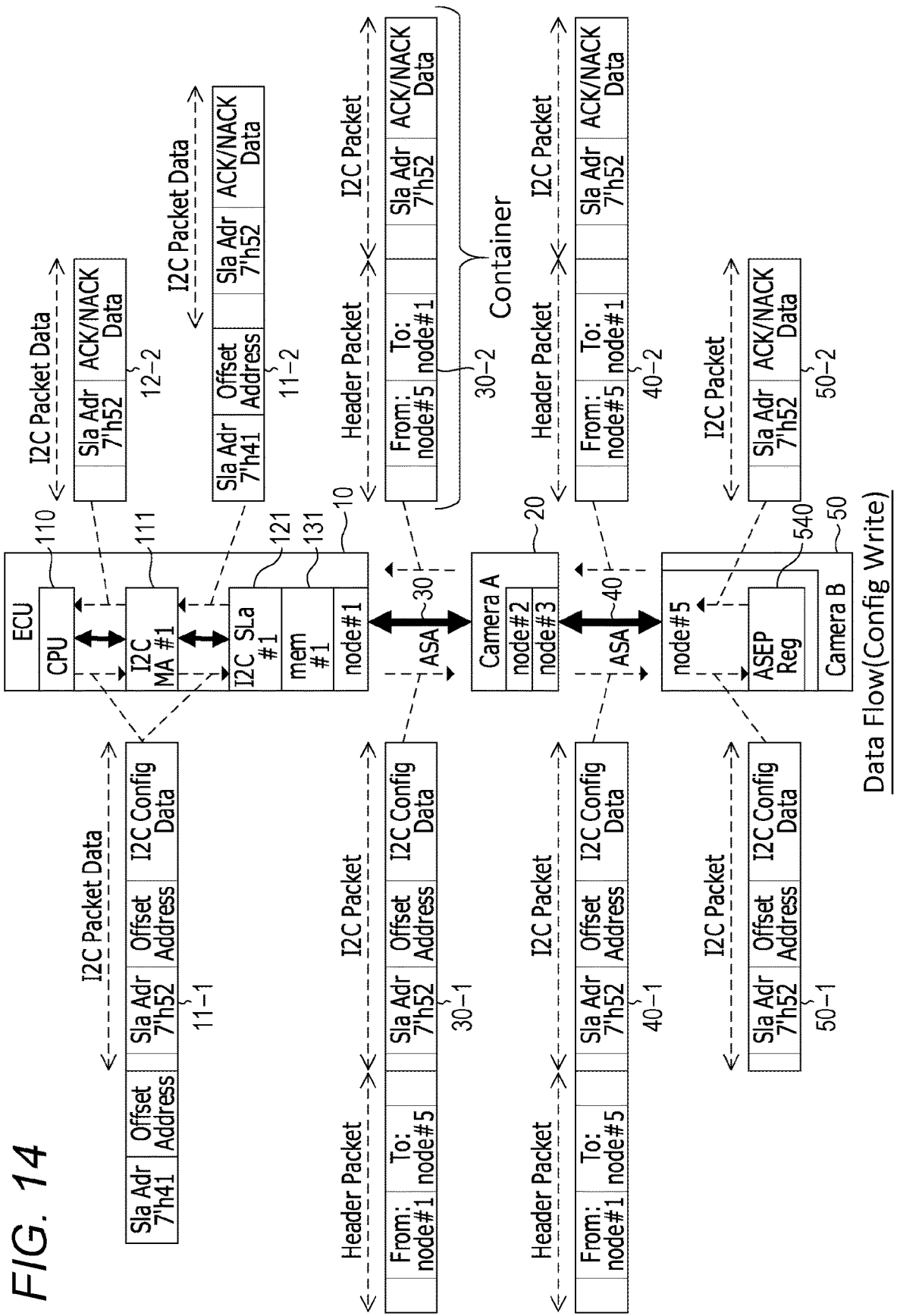
FIG. 14 is a data flow diagram illustrating writing of I2C Configuration Data in the basic mode.

FIG. 14 is a data flow diagram illustrating writing of I2C Configuration Data in the basic mode. Step 1 in FIG. 4 includes three steps of processing: Steps 1-1, 1-2, and 1-3. In Step 1-1, the CPU (110) instructs the I2C MASTER #1 (111) to write I2C Packet Data including I2C Configuration Data for the ASEP Register (540), to the Internal Memory #1 (131) of the I2C SLAVE #1 (121) ((11-1) in FIG. 14).

Next, in Step 1-2, the I2C MASTER #1 (111) transmits the I2C Packet Data accompanied with a write address (0x2000) for the Internal Memory #1 (131) to the Slave Address (7'h41) of the I2C SLAVE #1 (121) ((11-1) in FIG. 14).

Next, in Step 1-3, the I2C SLAVE #1 (121) writes the received I2C Packet Data to the Internal Memory #1 (131).

Figure 4:
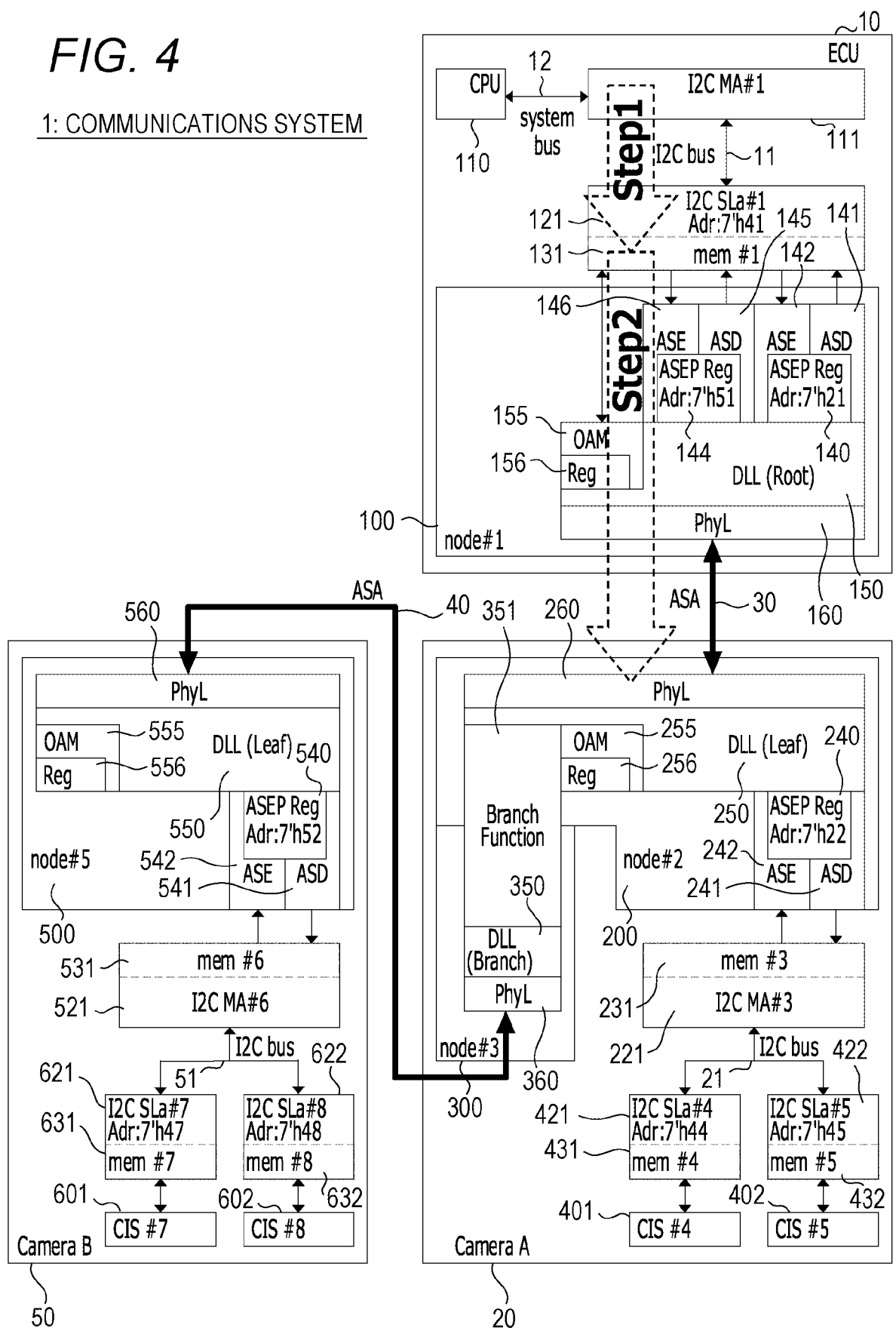
FIG. 4 is an explanatory diagram illustrating a processing operation of an information processing device according to a basic mode of the present disclosure.

Step 2 in FIG. 4 includes three steps of processing: Steps 2-1, 2-2, and 2-3. In Step 2-1, once the I2C Packet Data is written in the Internal Memory #1 (131), the ASE (146) reads the I2C Packet Data, converts the I2C Packet Data into the I2C Packet for the ASA, and transmits the I2C Packet to the DLL (150).

In Step 2-2, the DLL (150) adds a Header Packet of the ASA node #1 as a transmission source and the ASA node #5 as a transmission destination to the I2C Packet received from the ASE (146), and transmits a Container (30-1) to the PhyL (160).

In Step 2-3, the PhyL (160) transmits the Container (30-1) to the opposite ASA node #2 (200) via the ASA (30).

Figure 5:
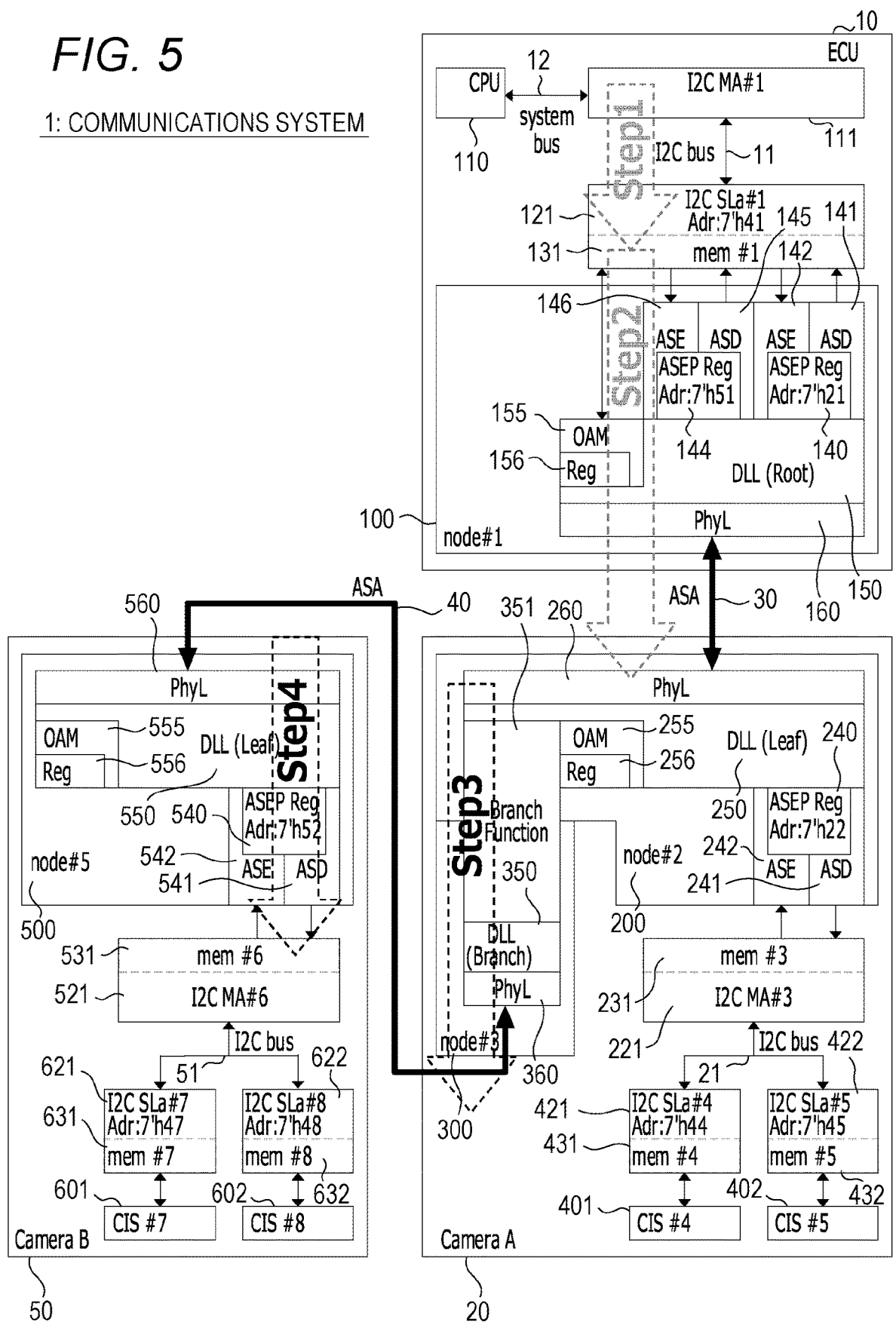
FIG. 5 is an explanatory diagram illustrating a processing operation subsequent to FIG. 4.

Step 3 in FIG. 5 includes five steps of processing: Steps 3-1, 3-2, 3-3, 3-4, and 3-5. In Step 3-1, the PhyL (260) in the ASA node #2 (200) restores the received Container (30-1) and transmits the Container (30-1) to the DLL (250).

In Step 3-2, the DLL (250) looks at the Header Packet in the received Container (30-1), determines that the Container (30-1) is an I2C Packet addressed to the ASA node #5, and transmits the Container (30-1) to the Branch Function Unit (351) as it is.

In Step 3-3, the Branch Function Unit (351) transmits the received Container (30-1) to the DLL (350).

In Step 3-4, the DLL (350) transmits the received Container (30-1) to the PhyL (360) as it is.

In Step 3-5, the PhyL (360) transmits the received Container (30-1), as a Container (40-1), to the opposite ASA node #5 (500) via an ASA (40).

Step 4 in FIG. 5 includes three steps of processing: Steps 4-1, 4-2, and 4-3. In Step 4-1, the PhyL (560) in the ASA node #5 (500) restores the received Container (40-1) and transmits the Container (40-1) to the DLL (550).

In Step 4-2, the DLL (550) looks at the Header Packet in the received Container (40-1), determines that the Container (40-1) is an I2C Packet addressed to the ASA node #5, and transmits the I2C packet to the corresponding ASD (541). In addition, the DLL (550) holds the ASA node #1 as a transmission source included in the received Header Packet.

In Step 4-3, the ASD (541) restores the original I2C Packet Data from the received I2C Packet, and the ASD (541) analyzes the restored I2C Packet Data and writes the I2C Configuration Data in the ASEP Register (540) addressed to the Slave Address (7'h52) (FIG. 2 and (50-1) in FIG. 14).

The ASD (541) also writes the I2C Configuration Data in the Internal Memory #6 (531) so that I2C Master #6 (521) sets the I2C operation speed of I2C bus (51).

In addition, the I2C Master #6 (521) is capable of understanding whether the offset address length of the Slave address to be managed is 8 bits or 16 bits.

Figure 6:
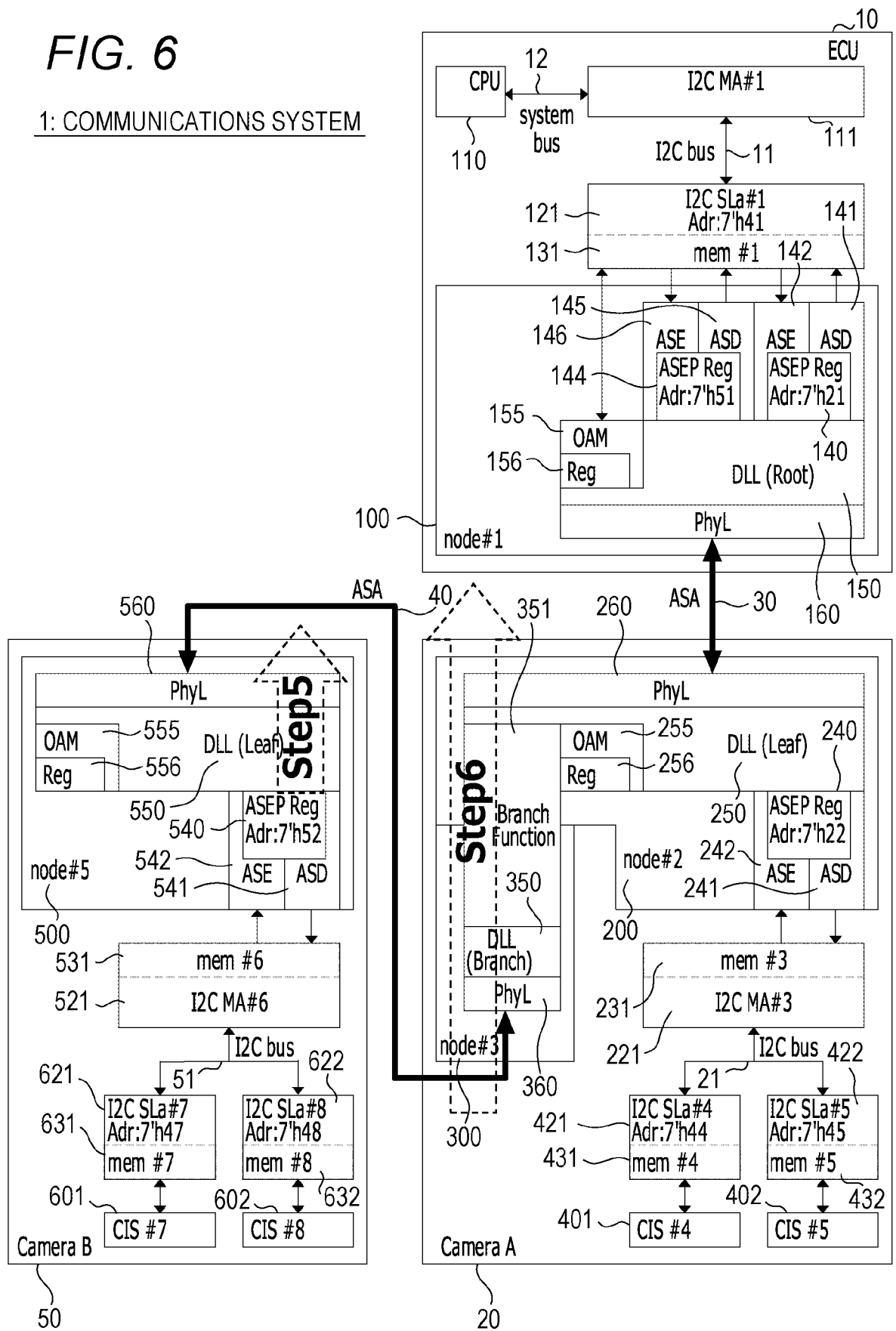
FIG. 6 is an explanatory diagram illustrating a processing operation subsequent to FIG. 5.

Step 5 in FIG. 6 includes three steps of processing: Steps 5-1, 5-2, and 5-3. In Step 5-1, every time the ASD (541) writes the I2C Configuration Data in the ASEP Register (540), the ASE (542) generates ACK/NACK as a write result and converts the ACK/NACK into a Packet of ACK/NACK data in the ASA. The ASE (542) transmits, to the DLL (550), an I2C Packet obtained by adding a Packet of the Slave Address as a write destination to a Packet of the ACK/NACK data ((50-2) in FIG. 14).

In Step 5-2, the DLL (550) adds a Header Packet of the ASA node #5 as a transmission source and the ASA node #1 as a transmission destination to the I2C Packet received from the ASE (542), and transmits the Container (40-2) to the PhyL (560).

In Step 5-3, the PhyL (560) transmits the Container (40-2) to the opposite ASA node #3 (300) via the ASA (40).

Step 6 in FIG. 6 includes five steps of processing: Steps 6-1, 6-2, 6-3, 6-4, and 6-5. In Step 6-1, the PhyL (360) in the ASA node #3 (300) restores the received Container (40-2) and transmits the Container (40-2) to the DLL (350).

In Step 6-2, the DLL (350) looks at the Header Packet in the received Container (40-2), determines that the Container (40-2) is an I2C Packet addressed to the ASA node #1, and transmits the Container (40-2) to the Branch Function Unit (351) as it is.

In Step 6-3, the Branch Function Unit (351) transmits the received Container (40-2) to the DLL (250).

In Step 6-4, the DLL (250) transmits the received Container (40-2) to the PhyL (260) as it is.

In Step 6-5, the PhyL (260) transmits the received Container (40-2), as a Container (30-2), to the opposite ASA node #1 (100) via the ASA (30).

Figure 7:
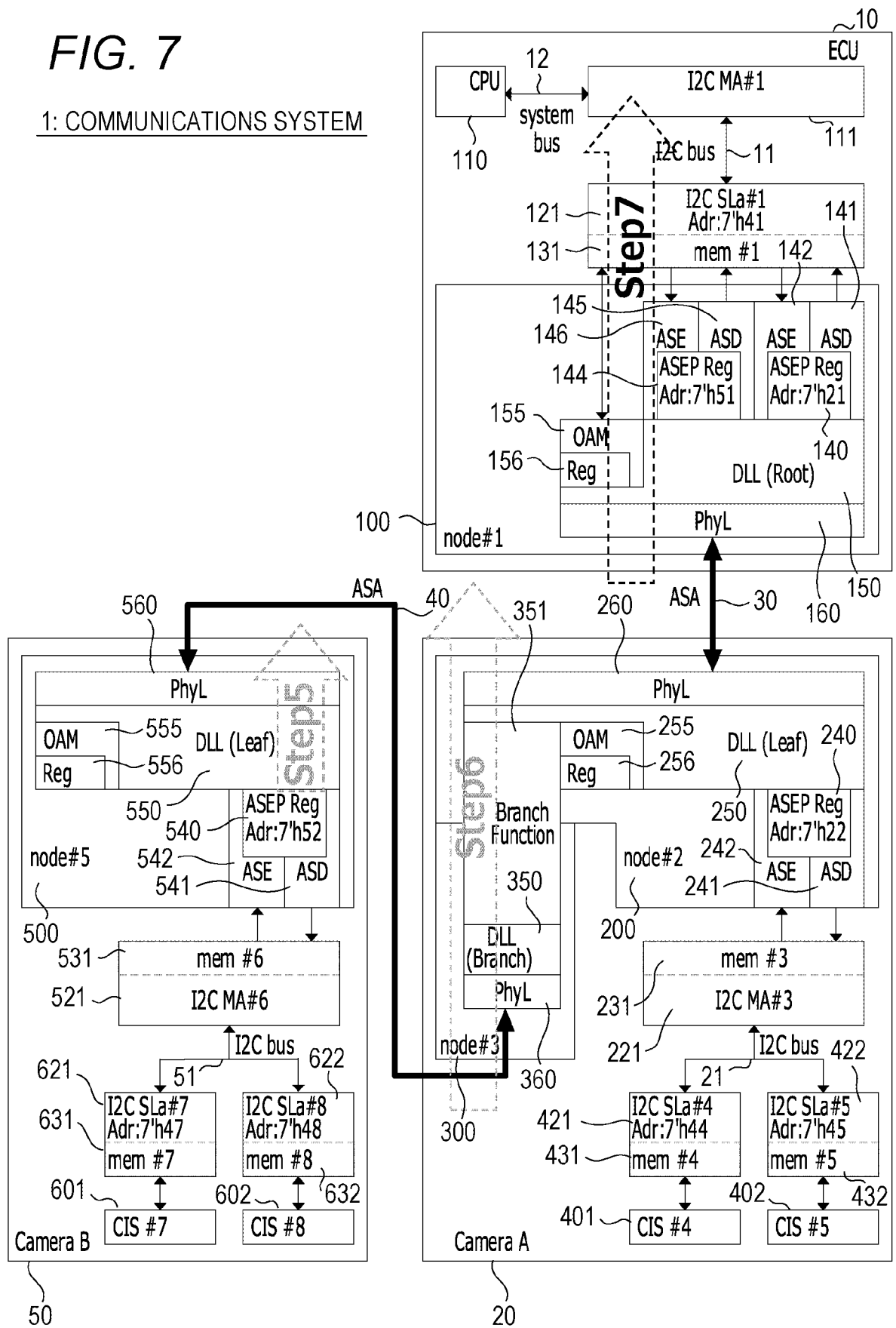
FIG. 7 is an explanatory diagram illustrating a processing operation subsequent to FIG. 6.

Step 7 in FIG. 7 includes six steps of processing: Steps 7-1, 7-2, 7-3, 7-4, 7-5, and 7-6. In Step 7-1, the PhyL (160) in the ASA node #1 (100) restores the received Container (30-2) and transmits the Container (30-2) to the DLL (150).

In Step 7-2, the DLL (150) looks at the Header Packet in the received Container (30-2), determines that the Container (30-2) is an I2C Packet addressed to the ASA node #1, and transmits the I2C packet to the corresponding ASD (145).

In Step 7-3, the ASD (145) restores the original I2C Packet Data from the received I2C Packet, and the ASD (145) writes the restored I2C Packet Data on and after the write address (0x2800) of the Internal memory #1 (131).

In Step 7-4, the CPU (110) periodically issues Read commands to the I2C MASTER #1 (111) to check whether the ACK/NACK data, which is a write result of the I2C Configuration Data, has been written in the Internal Memory #1 (131) of the I2C SLAVE #1 (121).

In Step 7-5, the I2C MASTER #1 (111) reads the I2C Packet Data accompanied with a read address (0x2800) for the Internal Memory #1 (131) to the Slave Address (7'h41) of the I2C SLAVE #1 (121) ((11-2) in FIG. 14).

In Step 7-6, the CPU (110) checks the I2C Packet Data ((12-2) in FIG. 14) read by the I2C MASTER #1 (111) to check whether the I2C Configuration Data has been written in the ASEP Register (540) in the ASA node #5 (500).

In an ASA V1.01, the CPU (110) in the ECU (10) gains access to the Internal Memory #1 (131) via the I2C Master (111) and the I2C Slave (121). As illustrated in FIG. 3, the Internal Memory #1 (131) is a memory map divided into a plurality of address regions, and the respective address regions can access different blocks.

Figure 8:
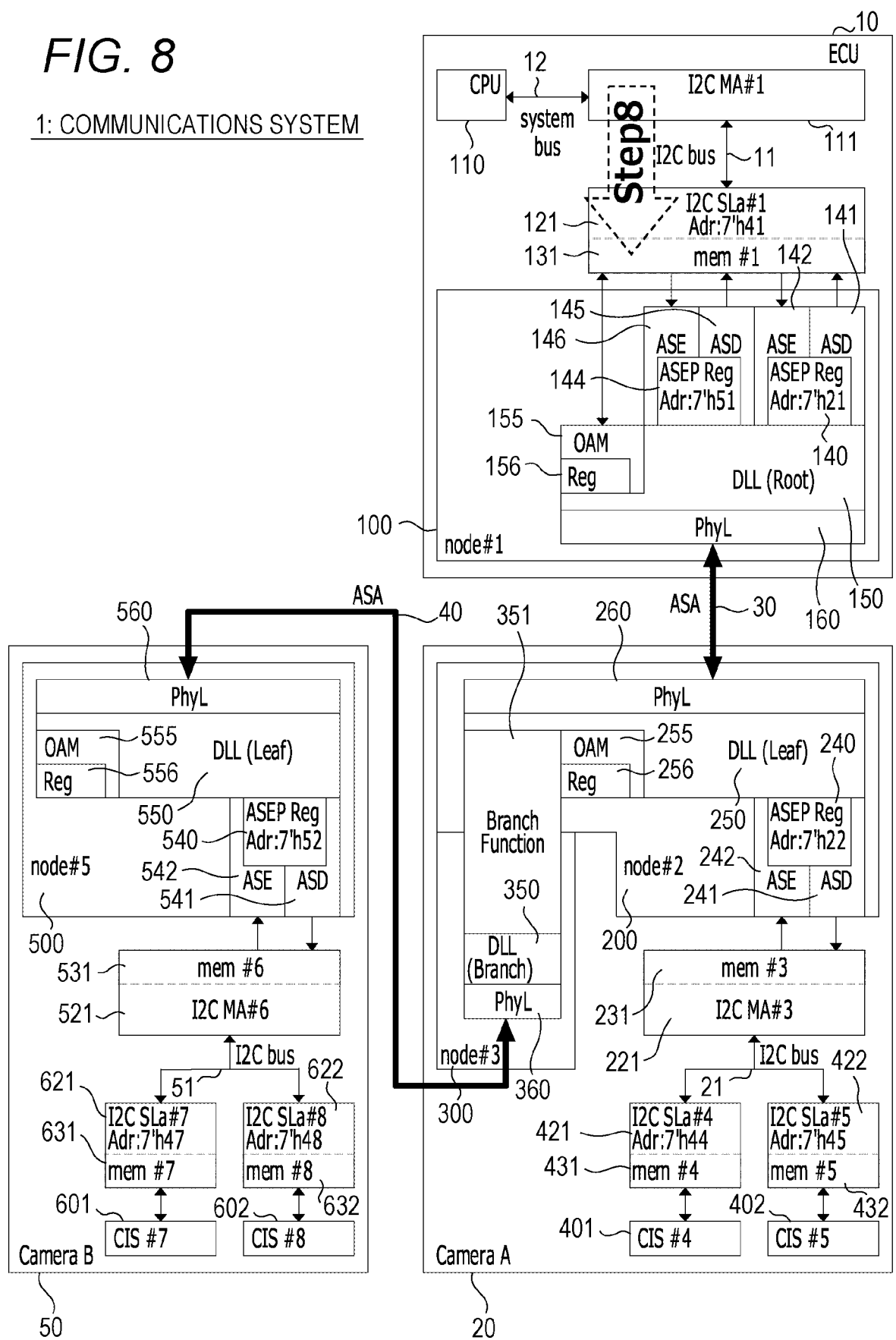
FIG. 8 is an explanatory diagram illustrating a processing operation subsequent to FIG. 7.

For example, in a case where the I2C Configuration Data has been written in the ASEP register (540) in Step 1 to Step 7 mentioned above, and the ECU (10) transmits the control data of the CIS #7 (601) built in the Camera B (50) to the Internal Memory #7 (631) through the I2C communication, the processing in Step 8 in FIG. 8 is performed. Step 8 in FIG. 8 includes three steps of processing: Steps 8-1, 8-2, and 8-3.

Figure 15:
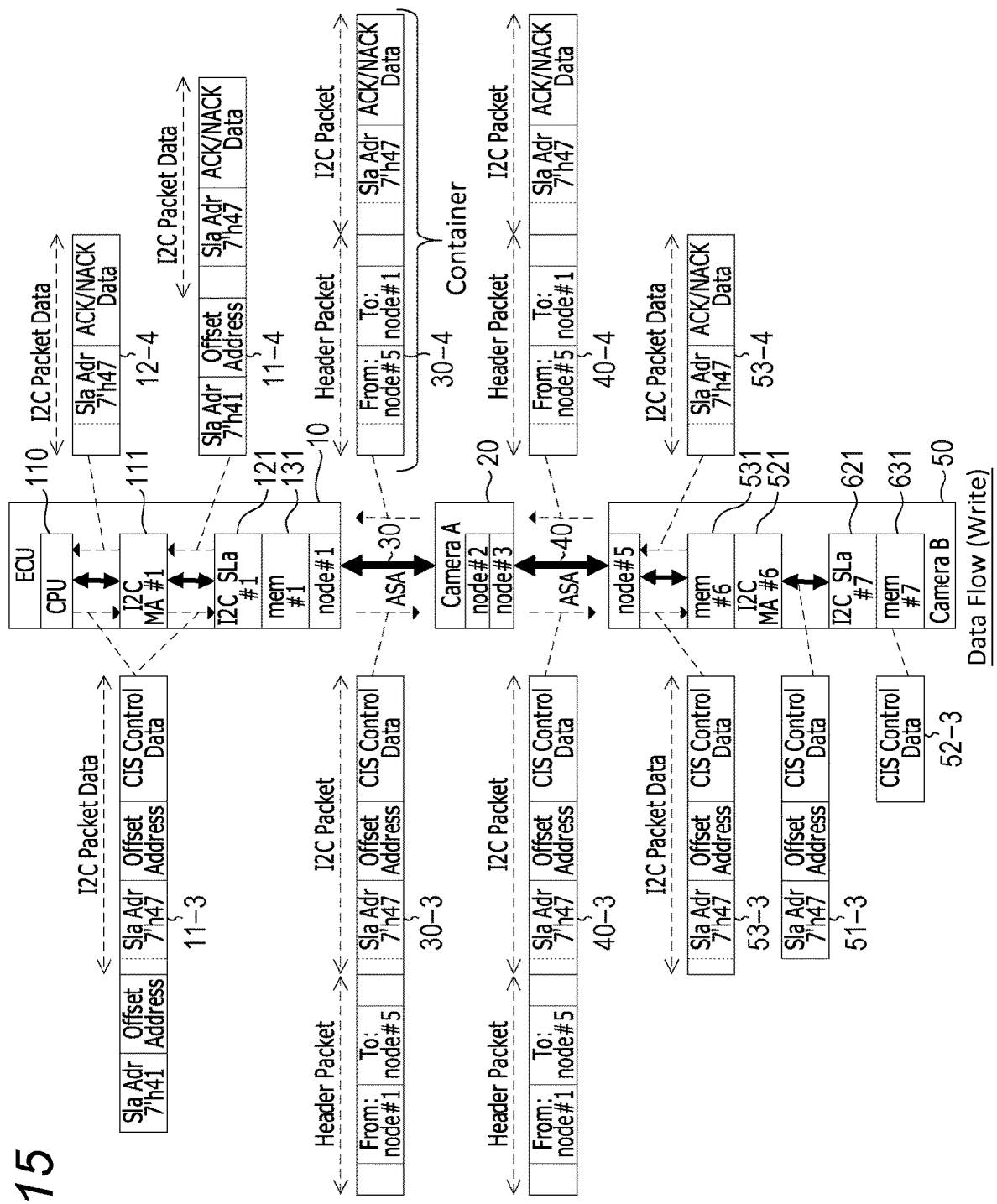
FIG. 15 is a data flow diagram illustrating writing of I2C data for controlling a CIS in the basic mode.

FIG. 15 is a data flow diagram illustrating writing of I2C data for controlling a CIS in the basic mode. In Step 8-1, the CPU (110) instructs the I2C MASTER #1 (111) to write I2C Packet Data including control data of the CIS #7 (601) to the Internal Memory #1 (131) of the I2C SLAVE #1 (121) ((11-3) in FIG. 15).

The I2C Packet Data includes a Slave Address (7'h47) of the I2C Slave #7 (621) and an offset address of the Internal Memory #7 (631).

In Step 8-2, the I2C MASTER #1 (111) transmits the I2C Packet Data accompanied with a write address (0x2000) for the Internal Memory #1 (131) to the Slave Address (7'h41) of the I2C SLAVE #1 (121) ((11-3) in FIG. 15).

Next, in Step 8-3, the I2C SLAVE #1 (121) writes the received I2C Packet Data to the Internal Memory #1 (131).

Figure 9:
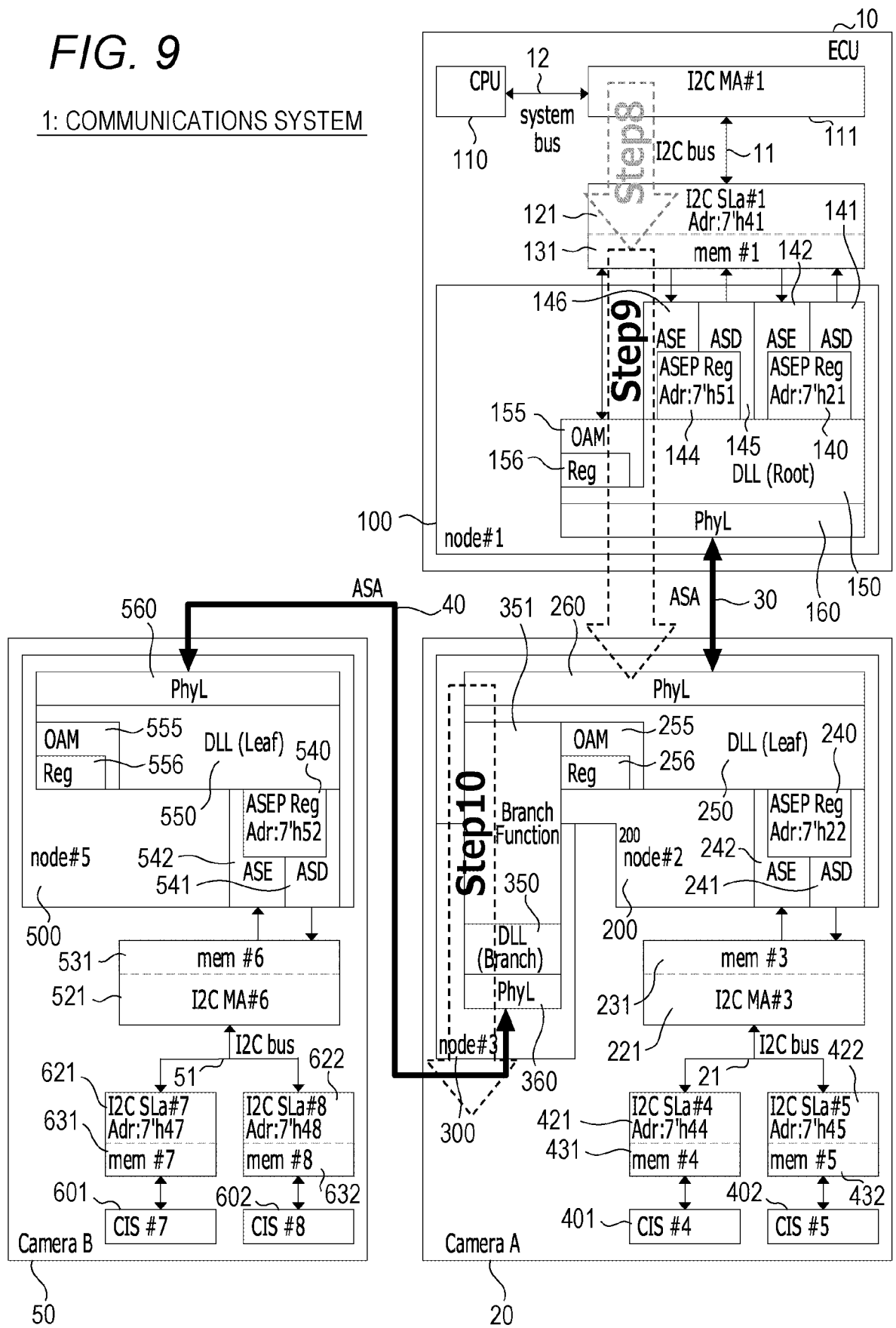
FIG. 9 is an explanatory diagram illustrating a processing operation subsequent to FIG. 8.

Step 9 in FIG. 9 includes three steps of processing: Steps 9-1, 9-2, and 9-3. In Step 9-1, once the I2C Packet Data is written in the Internal Memory #1 (131), the ASE (146) reads the I2C Packet Data, converts the I2C Packet Data into the I2C Packet for the ASA, and transmits the I2C Packet to the DLL (150).

In Step 9-2, the DLL (150) adds a Header Packet of the ASA node #1 as a transmission source and the ASA node #5 as a transmission destination to the I2C Packet received from the ASE (146), and transmits the Container (30-3) to the PhyL (160).

In Step 9-3, the PhyL (160) transmits the Container (30-3) to the opposite ASA node #2 (200) via the ASA (30).

Step 10 in FIG. 9 includes five steps of processing: Steps 10-1, 10-2, 10-3, 10-4, and 10-5. In Step 10-1, the PhyL (260) in the ASA node #2 (200) restores the received Container (30-3) and transmits the Container (30-3) to the DLL (250).

In Step 10-2, the DLL (250) looks at the Header Packet in the received Container (30-3), determines that the Container (30-3) is an I2C Packet addressed to the ASA node #5, and transmits the Container (30-3) to the Branch Function Unit (351) as it is.

In Step 10-3, the Branch Function Unit (351) transmits the received Container (30-3) to the DLL (350).

In Step 10-4, the DLL (350) transmits the received Container (30-3) to the PhyL (360) as it is.

In Step 10-5, the PhyL (360) transmits the received Container (30-3), as a Container (40-3), to the opposite ASA node #5 (500) via the ASA (40).

Figure 10:
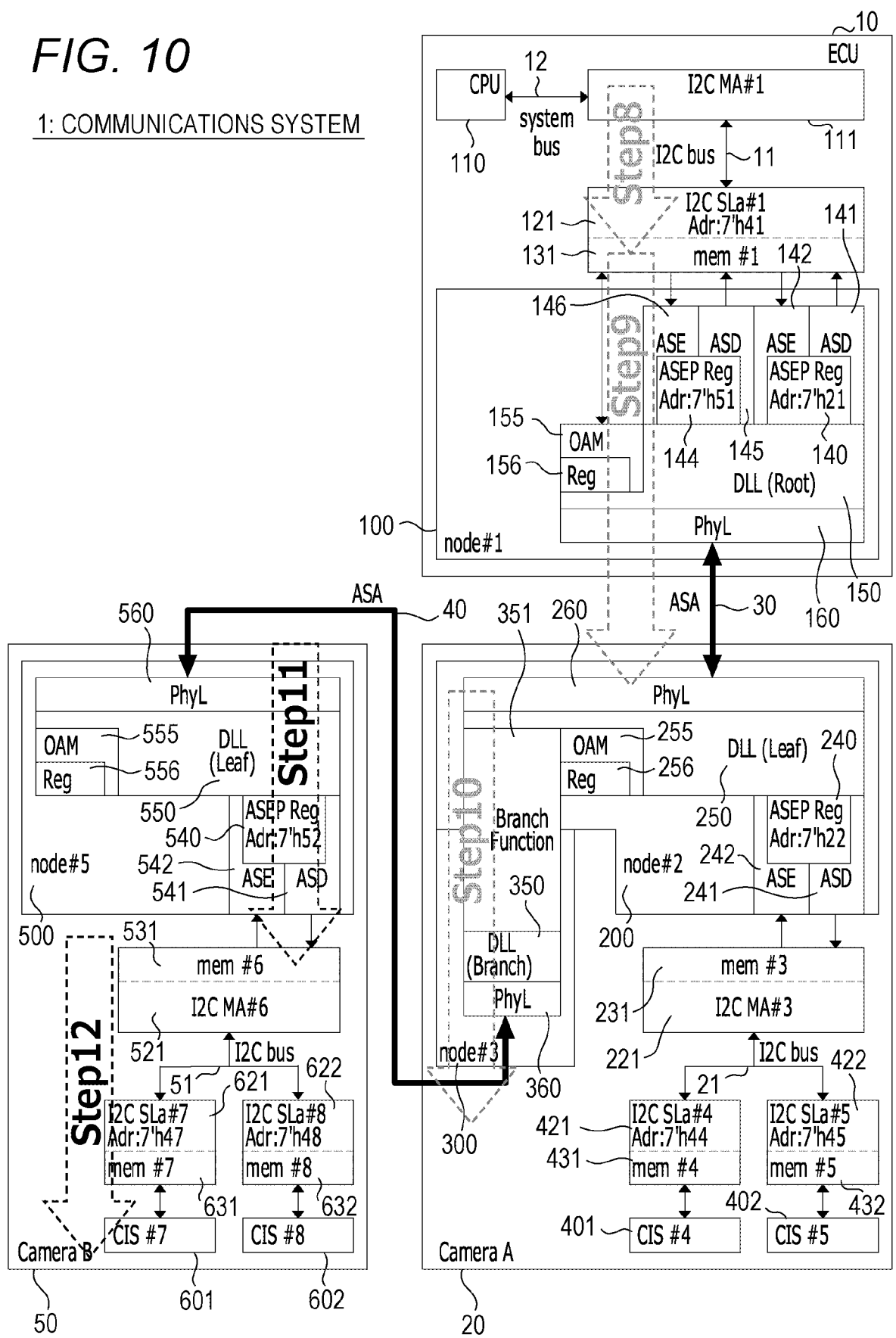
FIG. 10 is an explanatory diagram illustrating a processing operation subsequent to FIG. 9.

Step 11 in FIG. 10 includes three steps of processing: Steps 11-1, 11-2, and 11-3. In Step 11-1, the PhyL (560) in the ASA node #5 (500) restores the received Container (40-3) and transmits the Container (40-3) to the DLL (550).

In Step 11-2, the DLL (550) looks at the Header Packet in the received Container (40-3), determines that the Container (40-3) is an I2C Packet addressed to the ASA node #5, and transmits the I2C Packet to the corresponding ASD (541). In addition, the DLL (550) holds the ASA node #1 as a transmission source included in the received Header Packet.

In Step 11-3, the ASD (541) restores the original I2C Packet Data from the received I2C Packet, and ASD (541) analyzes the restored I2C Packet Data, and determines that the I2C Packet Data is CIS control data addressed to the Slave Address (7'h47). The ASD (541) writes the restored I2C Packet Data in the Internal Memory #6 (531) ((53-3) in FIG. 15).

Step 12 in FIG. 10 includes three steps of processing: Steps 12-1, 12-2, and 12-3. In Step 12-1, the I2C Master #6 (521) reads the I2C Packet Data written in the Internal Memory #6 (531), and transmits the I2C Packet Data to the I2C bus (51) as an I2C signal according to the I2C Configuration Data set in Step 4-3 ((51-3) in FIG. 15).

In Step 12-2, the I2C Slave #7 (621) receives the I2C signal addressed to the Slave Address (7'h 47), and writes the received control data of the CIS #7 (601) in the Internal Memory #7 (631) ((52-3) in FIG. 6).

(Fug6(52-3))

In Step 12-3, the CIS #7 (601) reads the control data written in the Internal Memory #7 (631).

Figure 11:
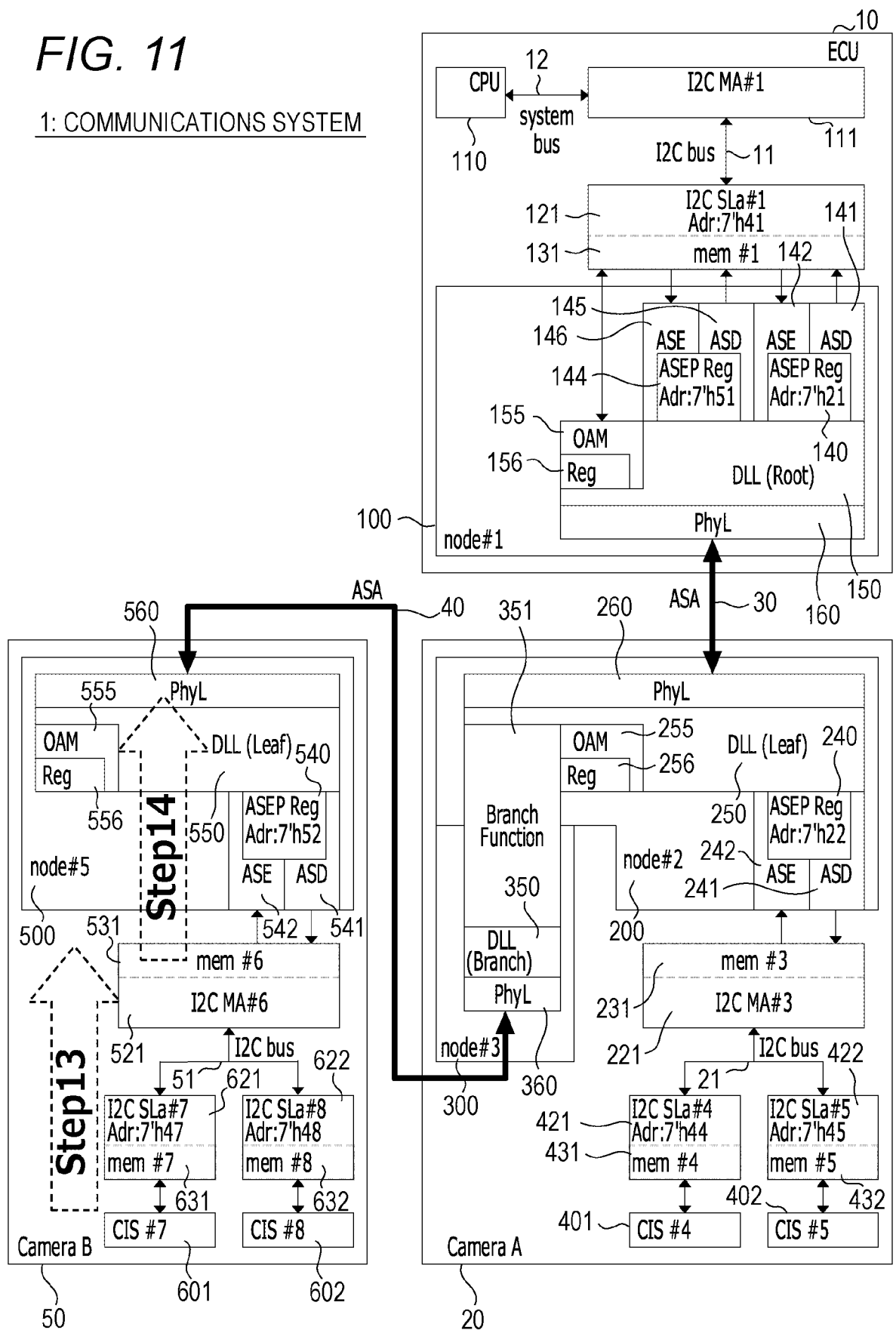
FIG. 11 is an explanatory diagram illustrating a processing operation subsequent to FIG. 10.

Step 13 in FIG. 11 includes Step 13-1. In Step 13-1, every time the I2C Slave #7 (621) writes the control data to the Internal Memory #7 (631) in Step 12-2, the I2C Slave #7 (621) returns the ACK/NACK to the I2C Master #6 (521). The I2C Master #6 (521) writes the received ACK/NACK in the Internal Memory #6 (531).

Step 14 in FIG. 11 includes three steps of processing: Steps 14-1, 14-2, and 14-3. In Step 14-1, once writing of the ACK/NACK in the Internal Memory #6 (531) is completed, the ASE (542) reads the ACK/NACK data. The ASE (542) converts the ACK/NACK data into an I2C Packet of the ASA obtained by adding a Packet of a Slave Address as a transmission source to a Packet of the ACK/NACK data, and transmits the Packet to the DLL (550) ((53-4) in FIG. 15).

In Step 14-2, the DLL (550) adds a Header Packet of the ASA node #5 as a transmission source and the ASA node #1 as a transmission destination to the I2C Packet received from the ASE (542), and transmits the Container (40-4) to the PhyL (560).

In Step 14-3, the PhyL (560) transmits the Container (40-4) to the opposite ASA node #3 (300) via the ASA (40).

Figure 12:
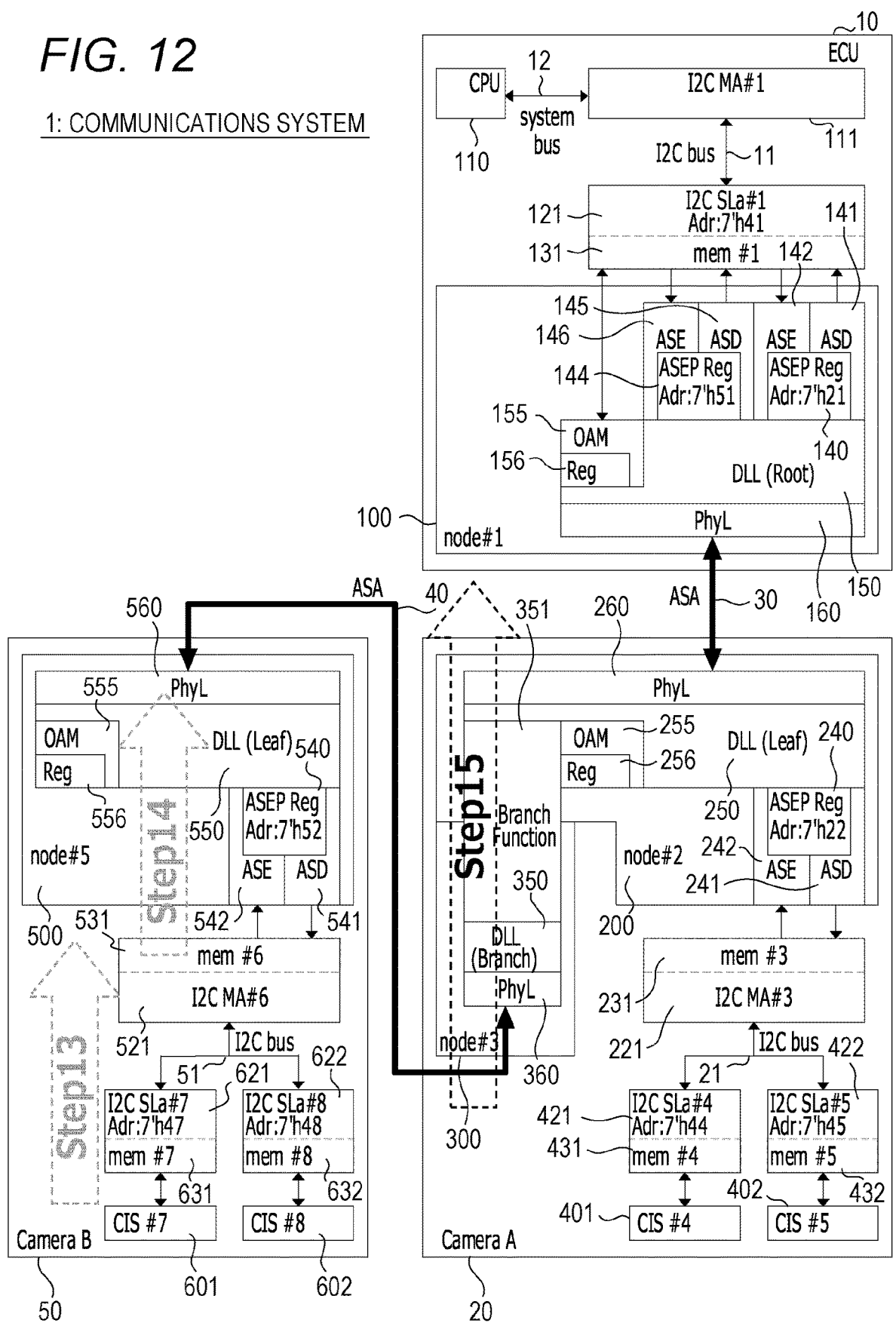
FIG. 12 is an explanatory diagram illustrating a processing operation subsequent to FIG. 11.

Step 15 in FIG. 12 includes five steps of processing: Step 15-1, 15-2, 15-3, 15-4, and 15-5. In Step 15-1, the PhyL (360) in the ASA node #3 (300) restores the received Container (40-4) and transmits the Container (40-4) to the DLL (350).

In Step 15-2, the DLL (350) looks at the Header Packet in the received Container (40-4), determines that the Container (40-4) is an I2C Packet addressed to the ASA node #1, and transmits the Container (40-4) to the Branch Function Unit (351) as it is.

In Step 15-3, the Branch Function Unit (351) transmits the received Container (40-4) to the DLL (250).

In Step 15-4, the DLL (250) transmits the received Container (40-4) to the PhyL (260) as it is.

In Step 15-5, the PhyL (260) transmits the received Container (40-4), as a Container (30-4), to the opposite ASA node #1 (100) via the ASA (30).

Figure 13:
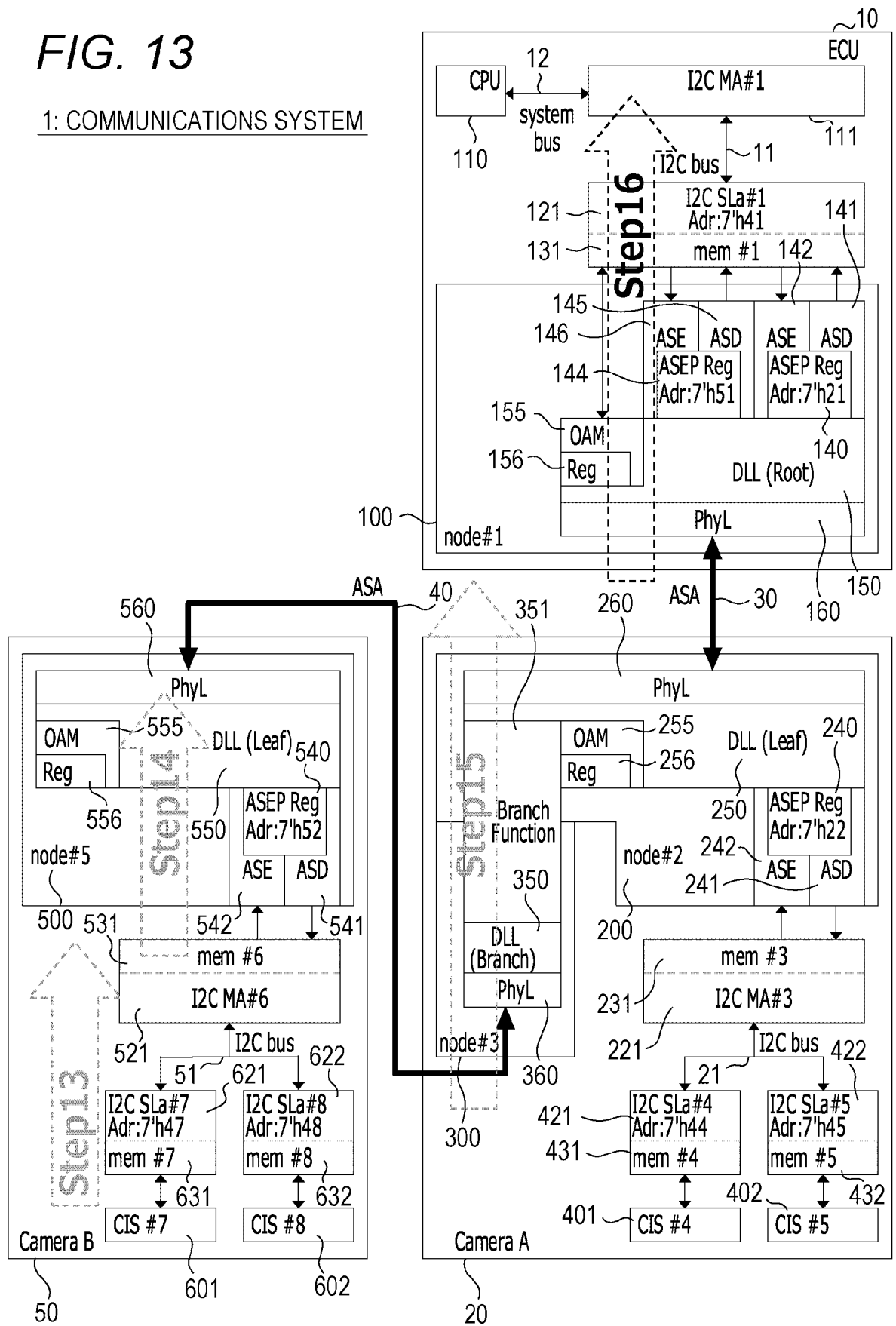
FIG. 13 is an explanatory diagram illustrating a processing operation subsequent to FIG. 12.

Step 16 in FIG. 13 includes six steps of processing: Steps 16-1, 16-2, 16-3, 16-4, 16-5, and 16-6. In Step 16-1, the PhyL (160) in the ASA node #1 (100) restores the received Container (30-4) and transmits the Container (30-4) to the DLL (150).

In Step 16-2, the DLL (150) looks at the Header Packet in the received Container (30-4), determines that the Container (30-4) is an I2C Packet addressed to the ASA node #1, and transmits the I2C Packet to the corresponding ASD (145).

In Step 16-3, the ASD (145) restores the original I2C Packet Data from the received I2C Packet, and the ASD (145) writes the restored I2C Packet Data on and after the write address (0x2800) of the Internal memory #1 (131).

In Step 16-4, the CPU (110) periodically issues Read commands to the I2C MASTER #1 (111) to check whether the ACK/NACK data, which is a write result of the control data of the CIS #7, has been written in the Internal Memory #1 (131) of the I2C SLAVE #1 (121).

In Step 16-5, the I2C MASTER #1 (111) reads the I2C Packet Data accompanied with a read address (0x2800) for the Internal Memory #1 (131) to the Slave Address (7'h41) of the I2C SLAVE #1 (121) ((11-4) in FIG. 15).

In Step 16-6, the CPU (110) checks the I2C Packet Data read by the I2C MASTER #1 (111) to check whether the control data of the CIS #7 has been successfully written in the Internal Memory #7 (631) of the I2C Slave #7 (621) ((12-4) in FIG. 15).

First Embodiment

Figure 16:
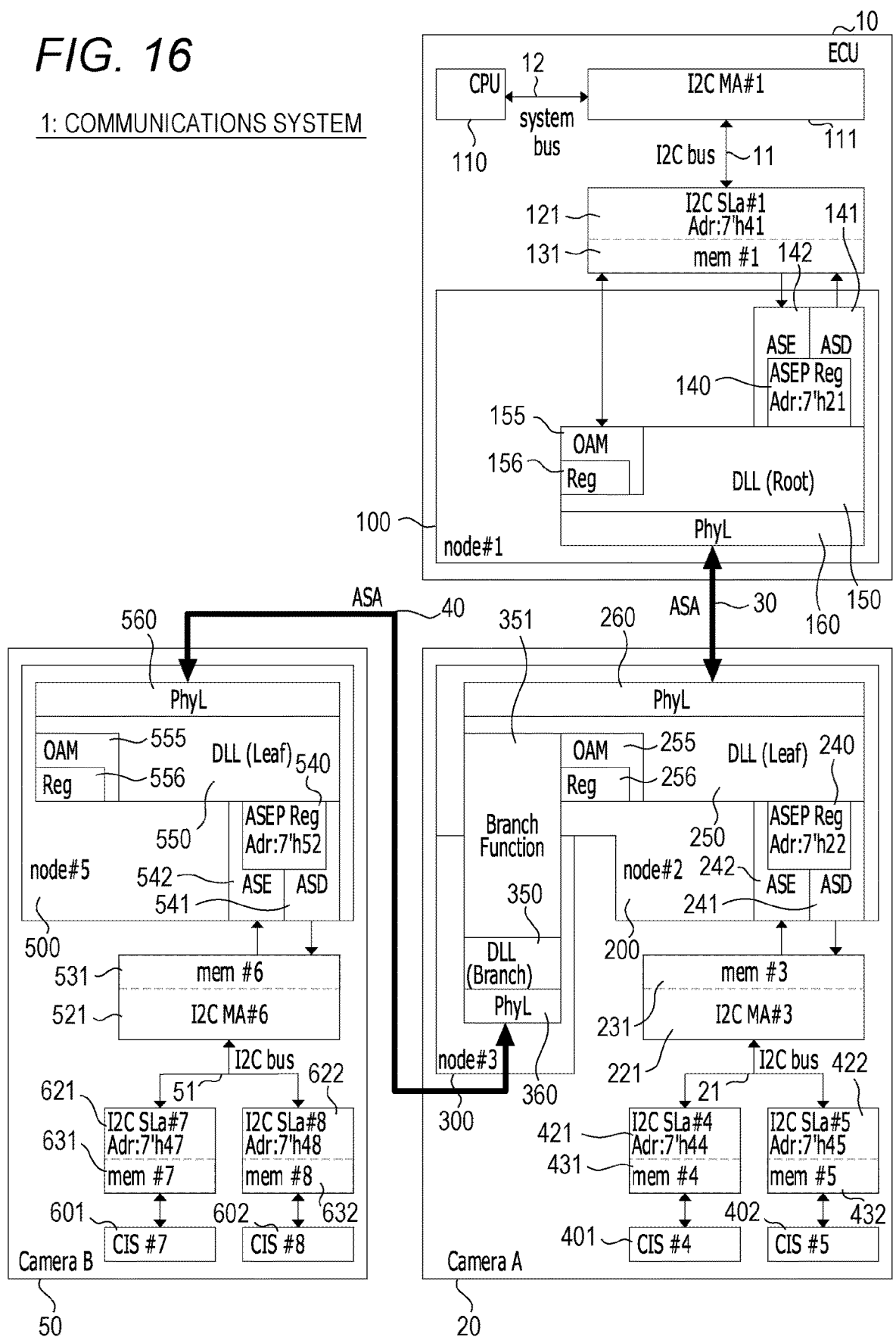
FIG. 16 is a block diagram illustrating a schematic configuration of a communication system according to a first embodiment.

FIG. 16 is a block diagram illustrating a schematic configuration of a communication system according to the first embodiment. The communication system according to the first embodiment includes an ECU (10) and two Camera A (20) and Camera B (40) connected by a daisy chain as illustrated in FIG. 16.

The ECU (10) includes a Root (100), a CPU (110), an I2C MASTER #1 (111), an I2C SLAVE #1 (121), and an Internal Memory (mem #1) (131). A Root (100) includes an encoder (ASE (142)), a decoder (ASD (141)), an ASEP Register (ASEP Reg (140)), a DLL (150), and a PhyL (160). The Internal Memory (mem #1) (131) may be provided inside the Root (100).

The internal configuration of the Root (100) according to the first embodiment illustrated in FIG. 16 partially differs from the internal configuration of the Root (100) in FIG. 1. Specifically, the Root (100) in FIG. 16 does not include the ASEP Reg (144), the ASD (145), and the ASE (146) included in the Root (100) in FIG. 1. Except for this point, the configuration of the communication system in FIG. 16 and the configuration of the communication system in FIG. 1 are the same.

In the first embodiment, the CPU (110) in the ECU (10) gains access to the Internal Memory #1 (131) via the I2C Master (111) and the I2C Slave (121).

Figure 17:
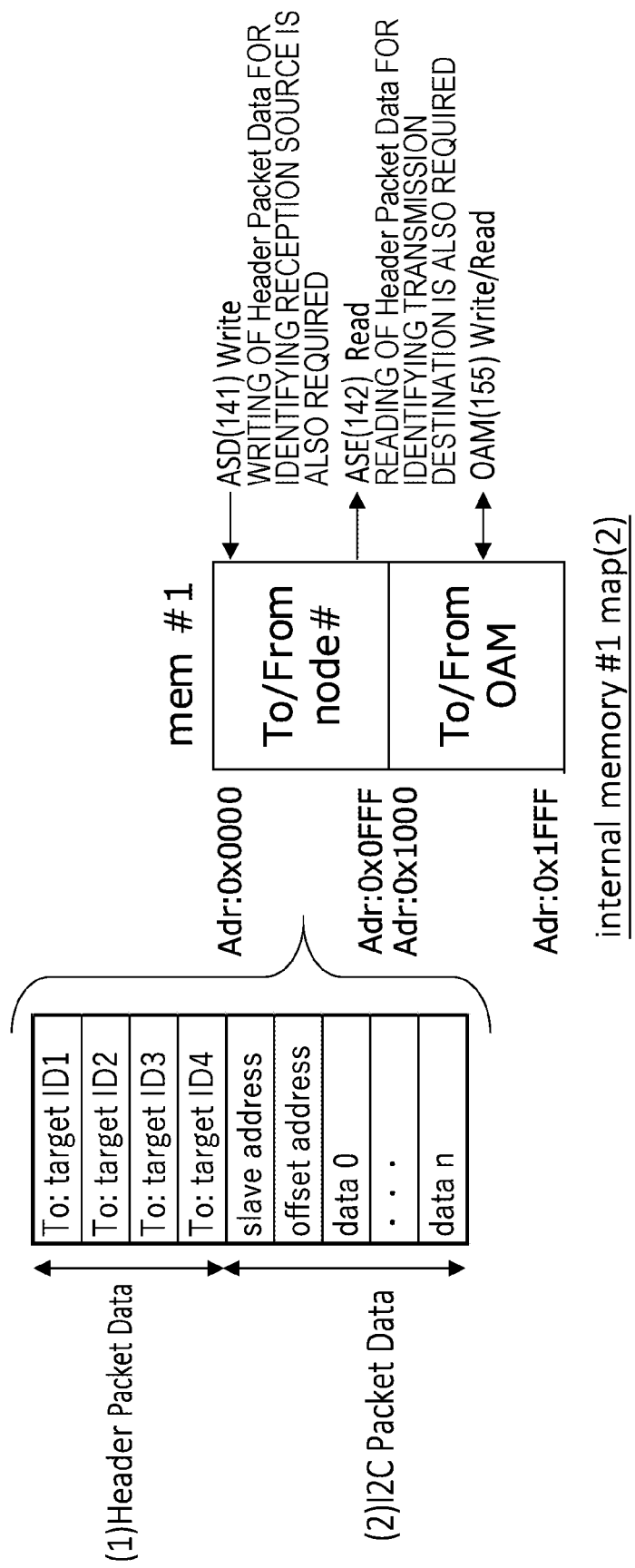
FIG. 17 is a diagram illustrating a memory map of an Internal Memory according to the first embodiment.

FIG. 17 is a diagram illustrating a memory map of the Internal Memory #1 (131) according to the first embodiment. The Internal Memory #1 (131) is a memory map shared by all ASA nodes. Therefore, the I2C MASTER #1 (111) writes the Header Packet Data ((1) in FIG. 17) as a source of the "ASA node # of the destination" to be inserted into the Header Packet and (2) the I2C Packet Data ((2) in FIG. 17) as a source of the I2C Packet in the address region of the Internal Memory #1 (131).

Note that, in a case where there is a plurality of destination ASA nodes #, the Header Packet Data includes a plurality of "ASA node IDs of destinations". More specifically, the Header Packet Data includes four target IDs compliant with the Automotive SerDes Alliance (ASA) standards.

As illustrated in FIG. 17, the Header Packet Data according to the first embodiment may be data having a fixed length in which an invalid ID is allocated to an unused node ID among the four target IDs.

Alternatively, the Header Packet Data may be data having a variable length in which information indicating the number of valid target IDs is added to the head of the Header Packet and then a valid target ID is allocated.

Therefore, in the first embodiment, the relation between the node (ASA node #2, ASA node #5) of the Leaf (200) (500) and the Slave address under the control thereof are not managed in the address regions of the Internal Memory #1 (131). In the first embodiment, the address region (0x0000-0xFFF) is a region where communication is established with the opposite ASA node.

The ASD (141) and the ASE (142) use an address region (0x0000-0xFFF) to generate and decompose packets for performing I2C communication with the opposite ASA node.

In addition, the OAM (155) uses an address region (0x1000-0x1FFF).

As described above, in the first embodiment, the relation between the Leaf node and the Slave address under the control thereof is managed as data within the Internal memory #1 (131), and thus, an ASE/ASD for each ASA node becomes unnecessary, and the memory capacity can be reduced as compared with the Internal Memory #1 (131) in FIG. 1.

In the first embodiment, the CPU (110) in the ECU (10) gains access to the Internal Memory #1 (131) via the I2C Master (111) and the I2C Slave (121).

The Internal Memory #1 (131) according to the first embodiment is a memory map shared by ASA nodes as illustrated in FIG. 17.

For example, in a case where the ECU (10) transmits control data of the CIS #7 (601) built into the Camera B (50) to the Internal memory #7 (631) through the I2C communication, the CPU (110) firstly needs to write I2C Configuration Data including the I2C CLK rate of the I2C bus (51) of the Camera B (50) and the Slave Address handled by the ASA node #5 (500) and having an offset address length of a flag (8 bits/16 bits), in the ASEP Register (540) (FIG. 2).

FIGS. 18 to 21 are explanatory diagrams each illustrating a processing operation of the information processing device according to the first embodiment. FIGS. 18 to 21 illustrate Steps 1, 2, 7, 8, 9, and 16, in the execution order, of the processing in the information processing device. The processing in the other processing steps is similar to that in FIGS. 4 to 13.

Figure 22:
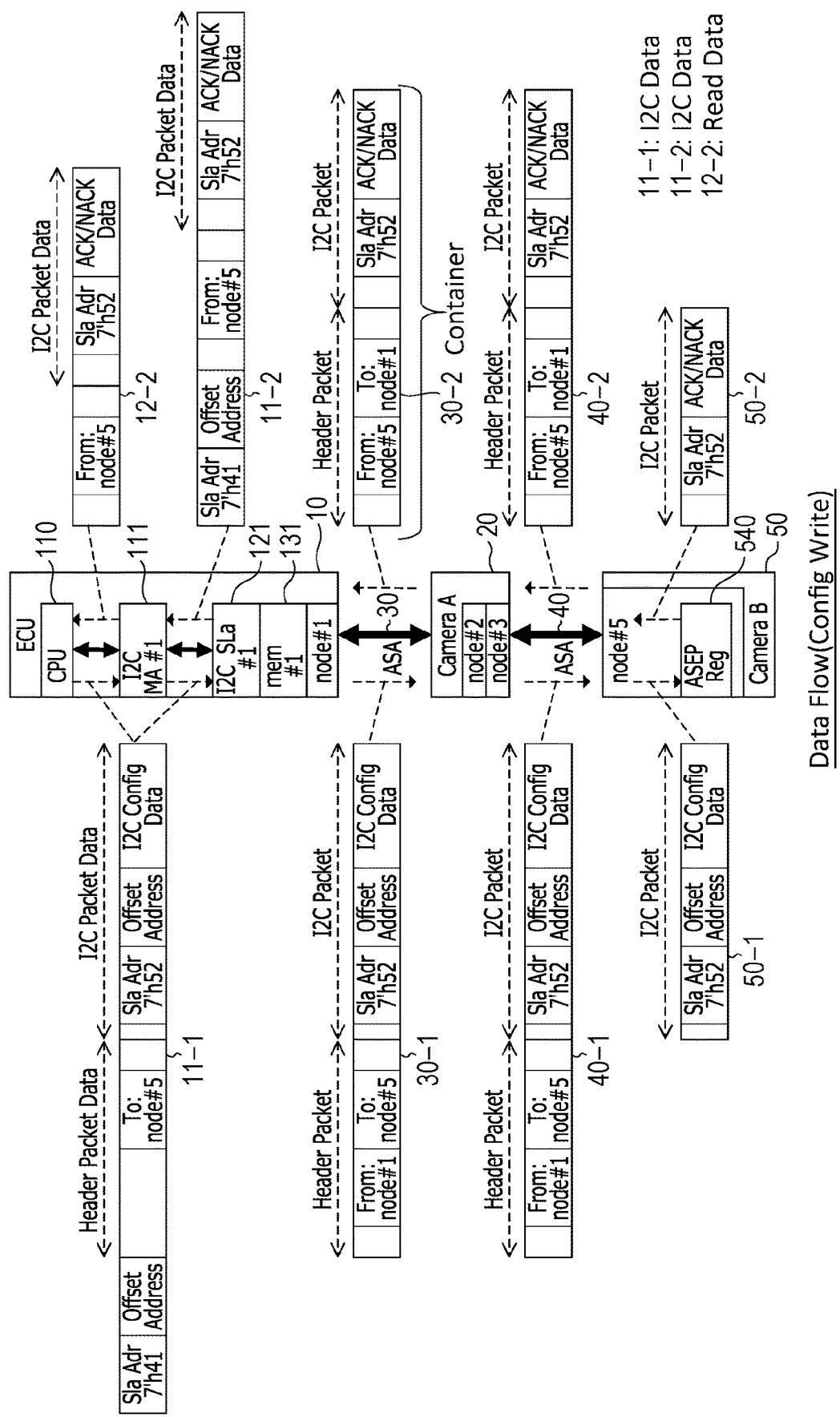
FIG. 22 is a data flow diagram illustrating writing of I2C Configuration Data according to the first embodiment.

FIG. 22 is a data flow diagram illustrating writing of I2C Configuration Data according to the first embodiment.

Figure 23:
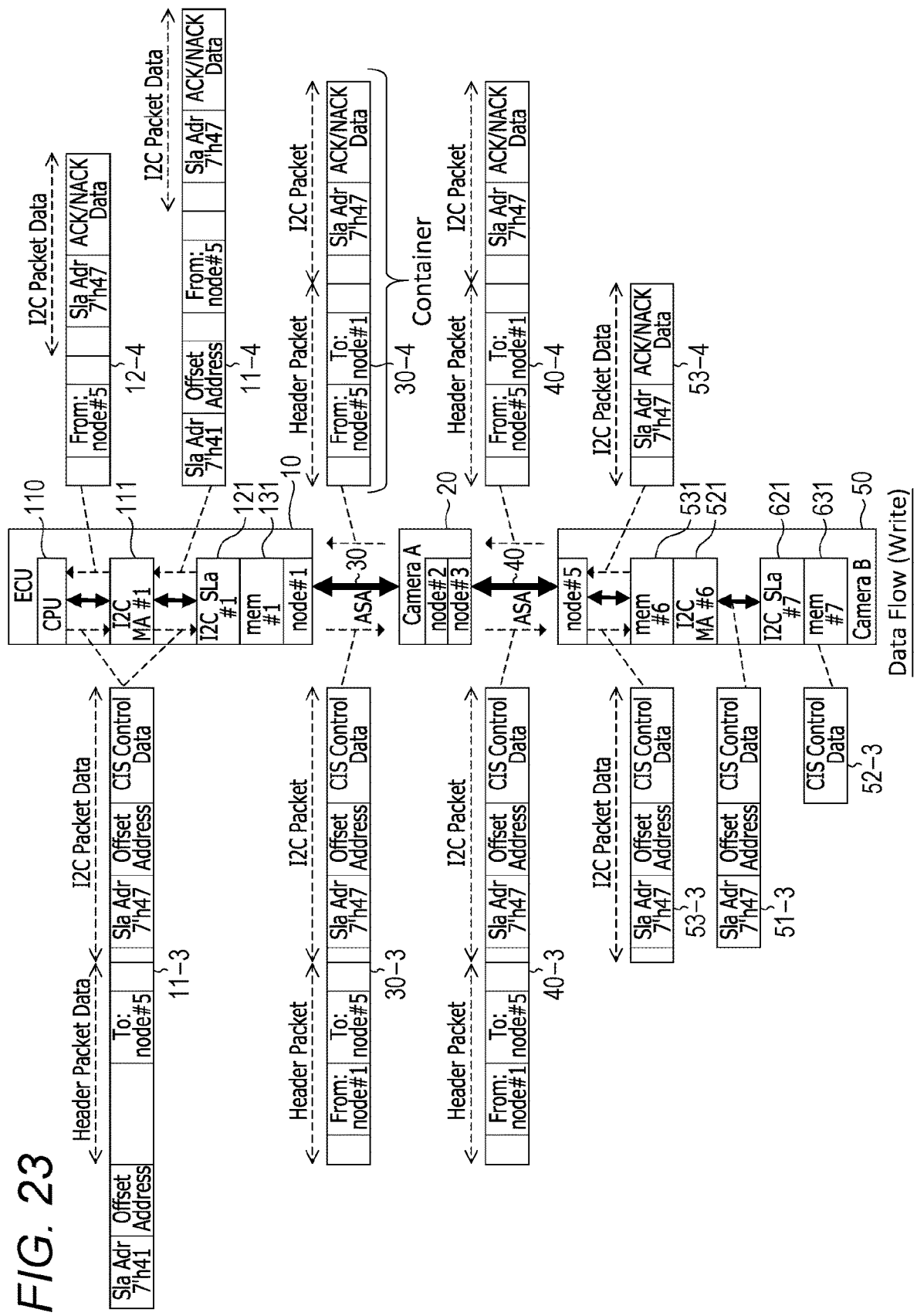
FIG. 23 is a data flow diagram illustrating writing of I2C data for controlling a CIS according to the first embodiment.

FIG. 23 is a data flow diagram illustrating writing of I2C data for controlling a CIS according to the first embodiment.

Figure 18:
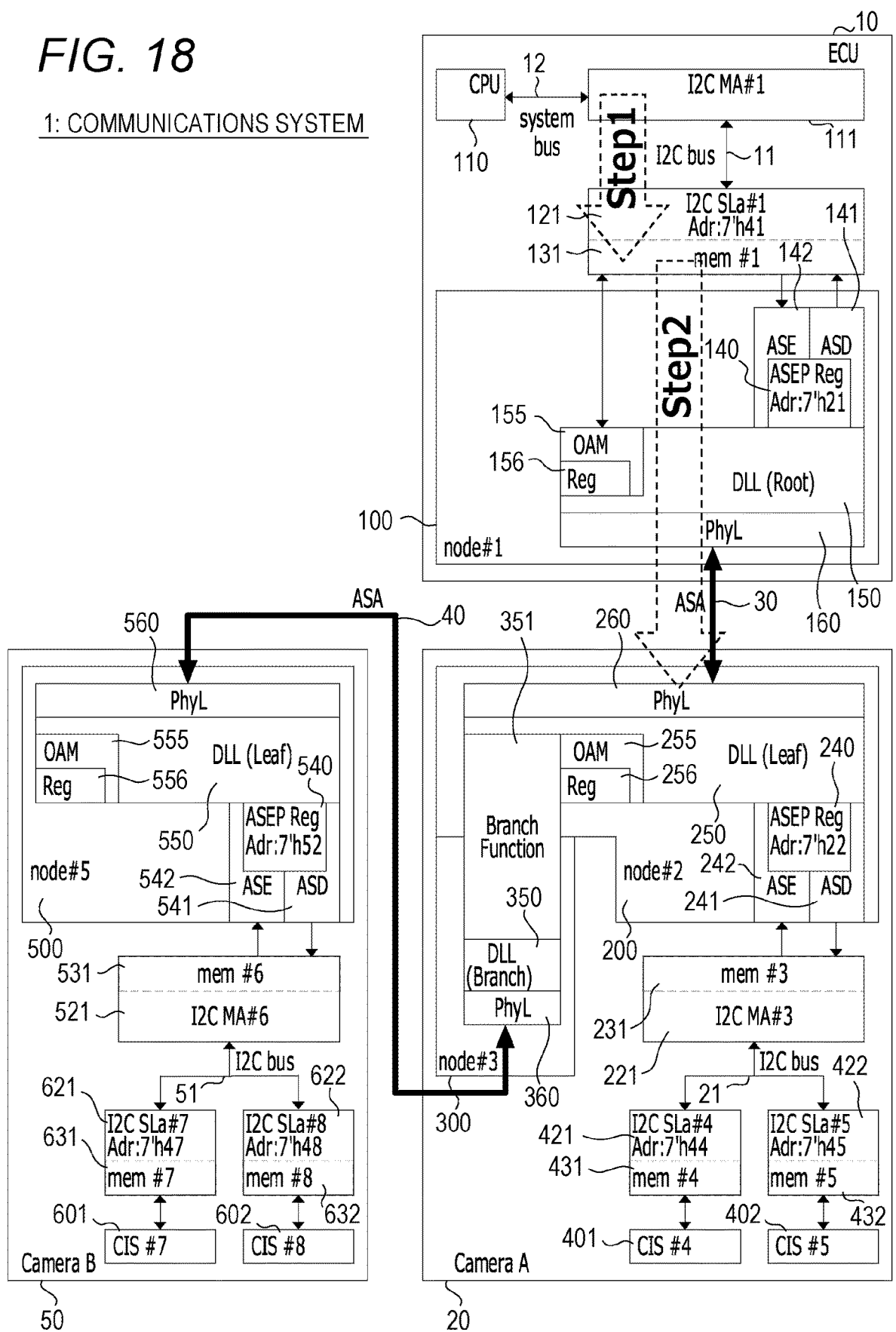
FIG. 18 is an explanatory diagram illustrating a processing operation of an information processing device according to the first embodiment.

Step 1 in FIG. 18 includes three steps of processing: Steps 1-1, 1-2, and 1-3. In Step 1-1, the CPU (110) instructs the I2C MASTER #1 (111) to write Header Packet Data ((1) in FIG. 17) including identification information (target ID) of the ASA node #5 as a destination to the ASEP Register (540) and I2C Packet Data ((2) in FIG. 17) including I2C Configuration Data to the Internal Memory #1 (131) of the I2C SLAVE #1 (121) ((11-1) in FIG. 22).

Note that the I2C Configuration Data to the ASEP Register (540) includes the I2C CLK rate of the I2C bus (51), a Slave Address (7'h47) managed by the ASA node #5 (500), and flag information (8 bits/16 bits) indicating the offset address length thereof.

In Step 1-2, the I2C MASTER #1 (111) transmits the Header Packet Data and the I2C Packet Data accompanied with a write address (0x000) for the Internal Memory #1 (131) to the Slave Address (7'h41) of the I2C SLAVE #1 (121) ((11-1) in FIG. 22).

In Step 1-3, the I2C SLAVE #1 (121) writes the received Header Packet Data and the I2C Packet Data to the Internal Memory #1 (131).

Step 2 in FIG. 18 includes three steps of processing: Steps 2-1, 2-2, and 2-3. In Step 2-1, once the Header Packet Data is written in the Internal Memory #1 (131), the ASE (142) reads the Header Packet Data and transmits the Header Packet Data to the DLL (150). Thereafter, once the I2C Packet Data is written in the Internal Memory #1 (131), the ASE (142) reads the I2C Packet Data, converts the I2C Packet Data into the I2C Packet for the ASA, and transmits the I2C Packet to the DLL (150).

In Step 2-2, the DLL (150) generates a Header Packet from the Header Packet Data received from the ASE (142) and its own ASA node #. In addition, the DLL (150) adds the generated Header Packet to the I2C Packet received from the ASE (142), and transmits the Container (30-1) to the PhyL (160).

In Step 2-3, the PhyL (160) transmits the Container (30-1) to the opposite ASA node #2 (200) via the ASA (30).

Step 3 to Step 6 in the first embodiment are identical to Step 3 to Step 6 in the basic mode illustrated in FIGS. 5 and 6, and thus, the explanation thereof is omitted.

Figure 19:
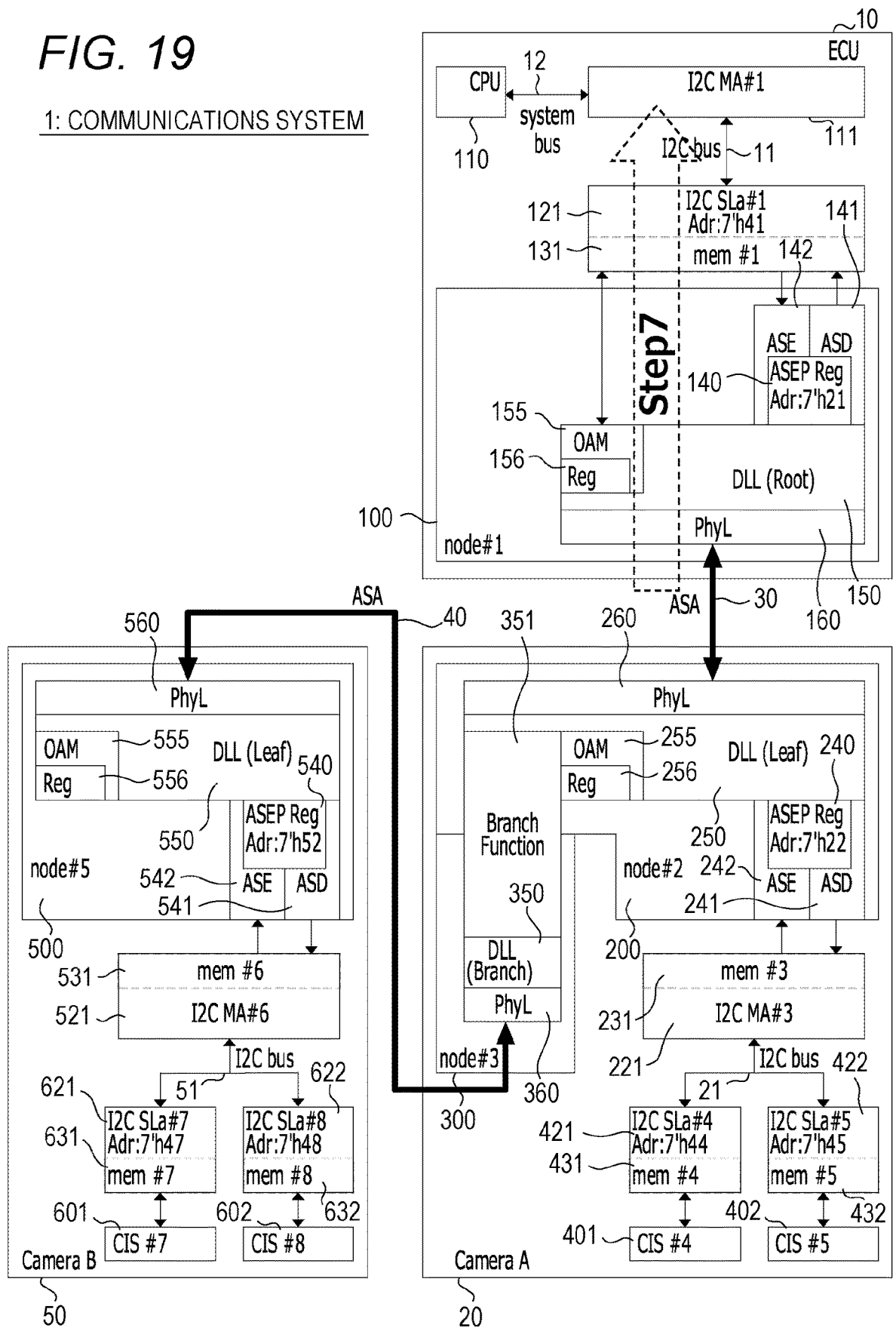
FIG. 19 is an explanatory diagram illustrating a processing operation subsequent to FIG. 18.

Step 7 in FIG. 19 includes six steps of processing: Steps 7-1, 7-2, 7-3, 7-4, 7-5, 7-6. In Step 7-1, the PhyL (160) in the ASA node #1 (100) restores the received Container (30-2) and transmits the Container (30-2) to the DLL (150).

In Step 7-2, the DLL (150) looks at the Header Packet in the received Container (30-2), determines that the Container (30-2) is an I2C Packet addressed to the ASA node #1, and transmits the ASA node information about a transmission source and the I2C Packet to the corresponding ASD (141).

In Step 7-3, the ASD (141) restores the original data from the received I2C Packet, and the ASD (141) writes the ASA node information about a transmission source and the restored I2C Packet Data on and after the write address (0x0800) of the Internal memory #1 (131).

In Step 7-4, the CPU (110) periodically issues Read commands to the I2C MASTER #1 (111) to check whether the ACK/NACK data, which is a write result of the I2C Configuration Data, has been written in the Internal Memory #1 (131) of the I2C SLAVE #1 (121).

In Step 7-5, the I2C MASTER #1 (111) reads the ASA node information about a transmission source and the I2C Packet Data accompanied with a read address (0x0800) for the Internal Memory #1 (131) to the Slave Address (7'h41) of the I2C SLAVE #1 (121) ((11-2) in FIG. 22).

In Step 7-6, the CPU (110) checks the ASA node information about a transmission source and the I2C Packet Data read by the I2C MASTER #1 (111) to check whether the I2C Configuration Data has been written in the ASEP Register (540) in the ASA node #5 (500) ((12-2) in FIG. 22).

Figure 20:
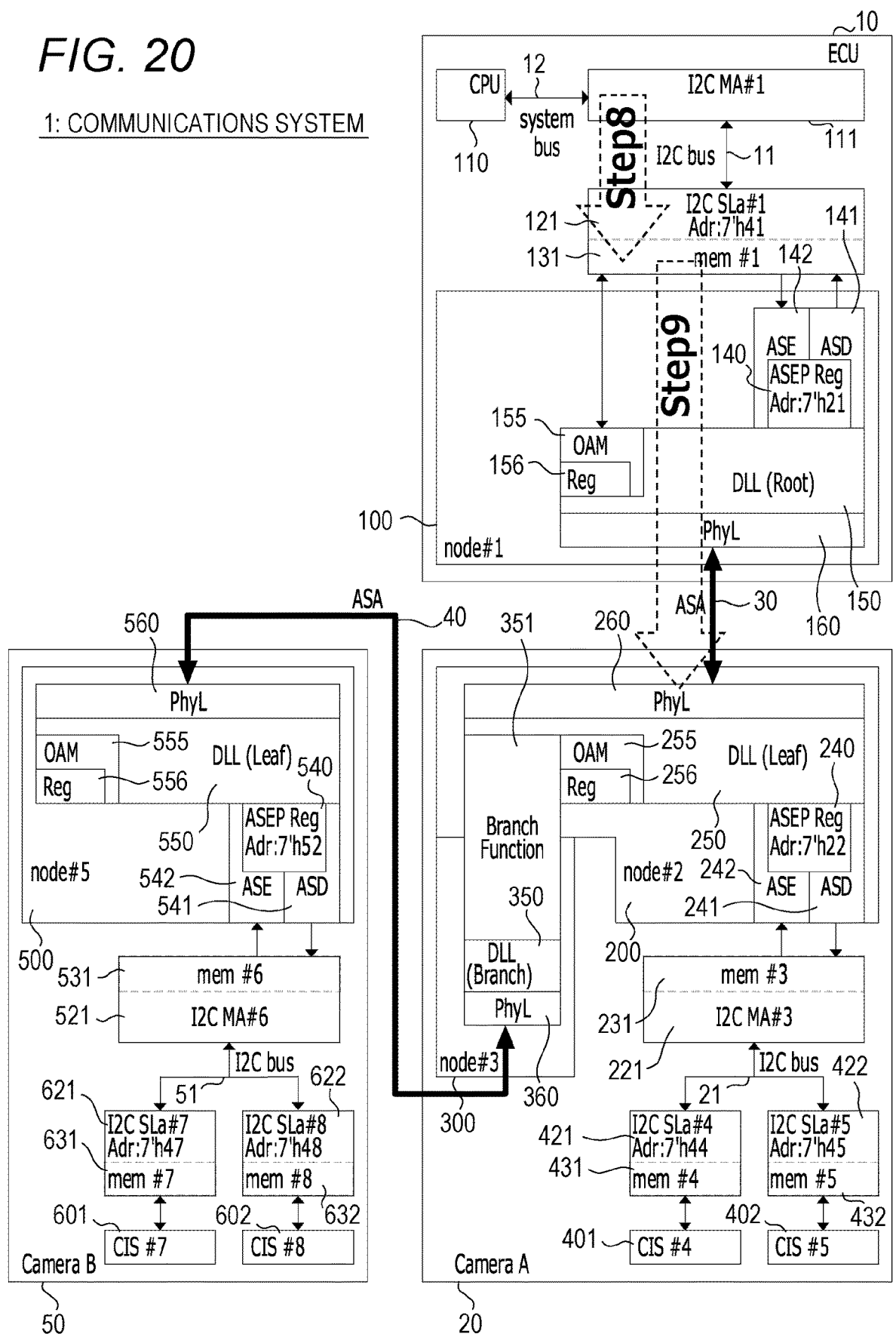
FIG. 20 is an explanatory diagram illustrating a processing operation subsequent to FIG. 19.

Step 8 in FIG. 20 includes three steps of processing: Steps 8-1, 8-2, and 8-3. For example, in a case where the I2C Configuration Data has been written in the ASEP Register (540) in Step 1 to Step 7, and the ECU (10) transmits control data of the CIS #7 (601) built in the Camera B (50) to the Internal memory #7 (631) through the I2C communication, the CPU (110) instructs the I2C MASTER #1 (111) to write the Header Packet Data ((1) in FIG. 17) indicating the ASA node 5 # as a destination and the I2C Packet Data ((2) in FIG. 17) including the control data of the CIS #7 (601) to the Internal Memory #1 (131) in the I2C SLAVE #1 (121) in Step 8-1 ((11-3) in FIG. 22).

Note that the I2C Packet Data includes a Slave Address (7'h47) of the I2C Slave #7 (621) and an offset address of the Internal Memory #7 (631).

In Step 8-2, the I2C MASTER #1 (111) transmits the Header Packet Data and the I2C Packet Data accompanied with a write address (0x000) for the Internal Memory #1 (131) to the Slave Address (7'h41) of the I2C SLAVE #1 (121) ((11-3) in FIG. 22).

In Step 8-3, the I2C SLAVE #1 (121) writes the received Header Packet Data and the I2C Packet Data to the Internal Memory #1 (131).

Step 9 in FIG. 20 includes three steps of processing: Steps 9-1, 9-2, and 9-3. In Step 9-1, once the Header Packet Data is written in the Internal Memory #1 (131), the ASE (142) reads the Header Packet Data and transmits the Header Packet Data to the DLL (150). Thereafter, once the I2C Packet Data is written in the Internal Memory #1 (131), the ASE (142) reads the I2C Packet Data, converts the I2C Packet Data into the I2C Packet for the ASA, and transmits the I2C Packet to the DLL (150).

In Step 9-2, the DLL (150) generates a Header Packet from the Header Packet Data received from the ASE (142) and its own ASA node #.

In addition, the DLL (150) adds the generated Header Packet to the I2C Packet received from the ASE (142), and transmits the Container (30-3) to the PhyL (160).

In Step 9-3, the PhyL (160) transmits the Container (30-3) to the opposite ASA node #2 (200) via the ASA (30).

Step 10 to Step 15 in the first embodiment are identical to Step 10 to Step 15 in the basic mode illustrated in FIGS. 9 to 12, and thus, the explanation thereof is omitted.

Figure 21:
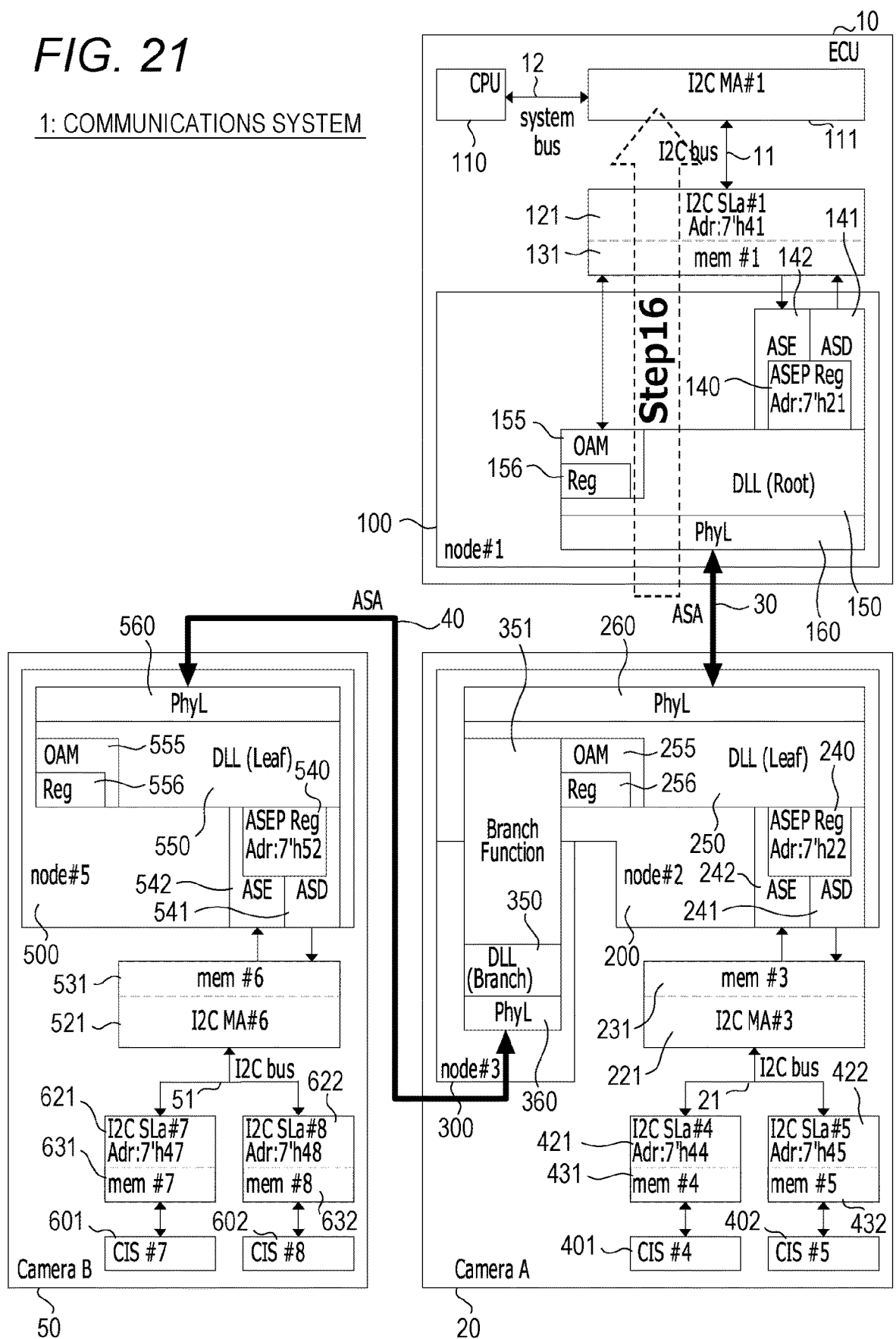
FIG. 21 is an explanatory diagram illustrating a processing operation subsequent to FIG. 20.

Step 16 in FIG. 21 includes six steps of processing: Steps 16-1, 16-2, 16-3, 16-4, 16-5, and 16-6. In Step 16-1, the PhyL (160) in the ASA node #1 (100) restores the received Container (30-4) and transmits the Container (30-4) to the DLL (150).

In Step 16-2, the DLL (150) looks at the Header Packet in the received Container (30-4), determines that the Container (30-4) is an I2C Packet addressed to the ASA node #1, and transmits the ASA node information about a transmission source and the I2C Packet to the corresponding ASD (141).

In Step 16-3, the ASD (141) restores the original I2C Packet Data from the received I2C Packet, and the ASD (141) writes the ASA node information about a transmission source and the restored I2C Packet Data on and after the write address (0x0800) of the Internal memory #1 (131).

In Step 16-4, the CPU (110) periodically issues Read commands to the I2C MASTER #1 (111) to check whether the ACK/NACK data, which is a write result of the control data of the CIS #7, has been written in the Internal Memory #1 (131) of the I2C SLAVE #1 (121).

In Step 16-5, the I2C MASTER #1 (111) reads the ASA node information about a transmission source and the I2C Packet Data accompanied with a read address (0x0800) for the Internal Memory #1 (131) to the Slave Address (7'h41) of the I2C SLAVE #1 (121) ((11-4) in FIG. 22).

In Step 16-6, the CPU (110) checks the ASA node information about a transmission source and the I2C Packet Data read by the I2C MASTER #1 (111) to check whether the control data of the CIS #7 has been successfully written in the Internal Memory #7 (631) of the I2C Slave #7 (621) ((12-4) in FIG. 22).

As described above, a first I2C communication instrument (for example, the I2C Master #1 (111) and the I2C Slave #1 (121)) is connected to the Root (100) according to the first embodiment, and the Root (100) causes the first I2C communication instrument (111, 121) and a second I2C communication instrument (221, 421, 422, 521, 621, 622) that is a communication partner device (for example, Leaf (200) or (500)) to establish communication therebetween.

The Root (100) includes the Internal Memory #1 (131), the encoder (ASE (142)), the decoder (ASD (140)), and a communication unit (DLL (150)). The Internal Memory #1 (131) stores therein Header Packet Data including a target ID of the second communication device (200, 500) and I2C Packet Data including a slave address and an offset address of the second I2C communication instrument.

The encoder (ASE (142)) generates Header Packet Data including a target ID of the communication partner device (200, 500) and I2C Packet Data including a slave address and an offset address of the second I2C communication instrument (221, 421, 422, 521, 621, 622). The communication unit (150, 160) transmits a transmission packet including Header Packet Data and I2C Packet Data generated by the encoder (142) to the communication partner device (200, 500) by a Time Division Duplex (TDD) communication scheme, and receives a reception packet from the communication partner device (200, 500) via the TDD communication scheme. The decoder (ASD (140)) generates I2C Packet Data from the reception packet.

Typically, the Header Packet Data includes a plurality of target IDs corresponding to a plurality of communication partner devices (200, 500). A memory space which stores therein the Header Packet Data and the I2C Packet Data includes a memory area for communication with the communication partner device (200, 500). For example, the Header Packet Data includes four target IDs compliant with the Automotive SerDes Alliance (ASA) standards. The encoder (142) and the decoder (141) are provided so as to be shared by a plurality of second I2C communication instruments corresponding to a plurality of target IDs.

A memory (131) which stores therein the Header Packet Data and the I2C Packet Data has a plurality of memory spaces each having a fixed length to store therein a plurality of target IDs included in the Header Packet Data. An invalid ID is stored in a memory space corresponding to an unused target ID.

The memory (131) which stores therein the Header Packet Data and the I2C Packet Data stores, as the I2C Packet Data, at least either one of the I2C Configuration Data including an operation setting of the second I2C communication instrument or the I2C Data for the second I2C communication instrument.

More specifically, the first communication device (100) which constitutes the Root (100) includes a first encoder (142), a communication unit (150, 160), and a first decoder (141). The first encoder (142) generates Header Packet Data including a target ID of the second communication device (200, 500) and I2C Packet Data including a slave address and an offset address of the second I2C communication instrument (221, 421, 422, 521, 621, 622). The communication unit (150, 160) transmits a transmission packet including Header Packet Data and I2C Packet Data generated by the first encoder (142) to the second communication device (200, 500) by a Time Division Duplex (TDD) communication scheme, and receives a reception packet from the second communication device (200, 500) via the TDD communication scheme. The first decoder (141) generates I2C Packet Data from the reception packet.

The second communication device (200, 500) which constitutes the Leaf (200) or (500) includes a second encoder (242, 542), a communication unit (250, 260, 550, 560), and a second decoder (241, 541).

The second encoder (242, 542) generates Header Packet Data including a target ID of the first communication device (100) and I2C Packet Data including a slave address and an offset address of the first I2C communication instrument (111, 121).

The communication unit (250, 260, 550, 560) transmits a transmission packet including Header Packet Data and I2C Packet Data generated by the second encoder (242, 542) to the first communication device (100) by a Time Division Duplex (TDD) communication scheme, and receives a reception packet from the first communication device (100) via the TDD communication scheme.

The second decoder (241, 541) generates I2C Packet Data from the reception packet.

Therefore, according to the first embodiment, it may be unnecessary to individually provide the I2C Packet Data for each Leaf (200) (500), and thus, the storage capacity of the Internal Memory #1 (131) can be reduced.

In addition, since the memory space in the Internal Memory #1 (131) which stores therein the Header Packet Data and the I2C Packet Data, is shared by all the I2C communication instruments in the Leaf (200) (500), it may be unnecessary to provide the ASE (142) and the ASD (141) for each I2C communication instrument in each communication device, whereby the number of the ASEs (142) and the ASDs (141) can be reduced and the configuration of the Root (100) can be simplified.

Second Embodiment

FIG. 24 is a diagram illustrating a part of information stored in the ASEP Register (I2C Address Register) of the Root (100) according to the second embodiment. FIG. 24 illustrates an example in which a target ID1 and a target ID2 are stored in the Offset Address (209) and a target ID3 and a target ID4 are stored in the Offset Address (210).

FIG. 25 is a diagram illustrating a correspondence relation between a target code [3:0] and a target ID [1:4]. There are 16 types of target codes [3:0], and combinations of the target ID1 to the target ID4 corresponding to respective target codes are provided.

Figure 26:
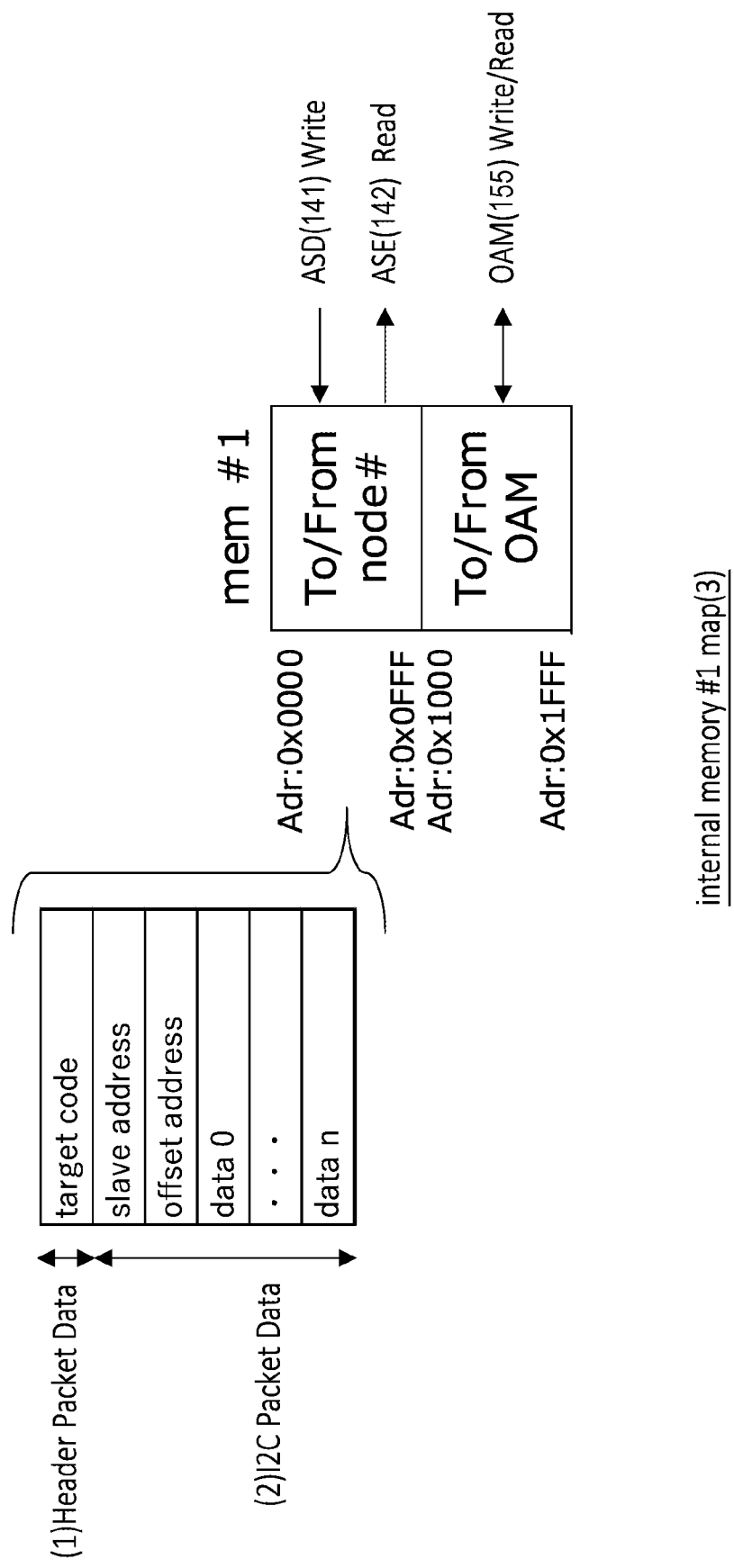
FIG. 26 is a diagram illustrating a data format written in the Internal memory.

FIG. 26 is a diagram illustrating a data format written in an Internal memory #1 (131). The Header Packet Data and the I2C Packet Data are written in the Internal memory #1 (131). The Header Packet Data includes a target code illustrated in FIG. 25, and the I2C Packet Data includes a slave address and an offset address.

In the second embodiment, the CPU (110) in the ECU (10) gains access to the Internal Memory #1 (131) via the I2C Master (111) and the I2C Slave (121). The Internal Memory #1 (131) according to the second embodiment is a memory map shared by ASA nodes. Accordingly, the I2C MASTER #1 (111) writes Header Packet Data and I2C Packet Data in data formats illustrated in FIG. 26 in the address region of the Internal Memory #1 (131).

As described above, in the second embodiment, the relation between the node (ASA node #2, ASA node #5) of the Leaf (200) (500) and the Slave address under the control thereof is not managed in the address region of the Internal Memory #1 (131).

In the second embodiment, the address region (0x0000-0xFFF) is a region where communication is established with the opposite ASA node. The ASD (141) and the ASE (142) perform the I2C communication with the opposite ASA node using the address region (0x0000-0xFFF). In addition, the OAM (155) uses an address region (0x1000-0x1FFF).

Once the ASE (142) reads a target code ((1) in FIG. 26), the ASE (142) changes the code from a target ID of the corresponding ASEP Reg (140) to the Header Packet Data format ((1) in FIG. 17) according to the first embodiment and transmits the code to the DLL (150).

As described above, in the second embodiment, similarly to the first embodiment, the relation between the Leaf (200) node and the Slave address under the control thereof are managed as data within the Internal memory #1, and thus, an ASE/ASD for each ASA node becomes unnecessary, and the memory capacity can be reduced as compared with the Internal Memory #1 (FIG. 3) in the basic mode.

Furthermore, in the second embodiment, the Header Packet Data necessary for each communication is reduced from 4 Bytes in the first embodiment to 1 Byte, which allows the I2C communication to be established with smaller data volume as compared with that in the first embodiment.

In the second embodiment, the CPU (110) in the ECU (10) gains access to the Internal Memory #1 (131) via the I2C Master (111) and the I2C Slave (121). As illustrated in FIG. 26, the Internal Memory #1 (131) is a memory map shared by ASA nodes.

For example, in a case where the ECU (10) transmits control data of the CIS #7 (601) built into the Camera B (50) to the Internal memory #7 (631) through the I2C communication, the CPU (110) firstly needs to write a target ID of the Leaf (200) node, which is a communication partner, in the ASEP Register (140) of the ASA node #1 (100) that is a Root (100) node as illustrated in FIG. 24.

Figure 27:
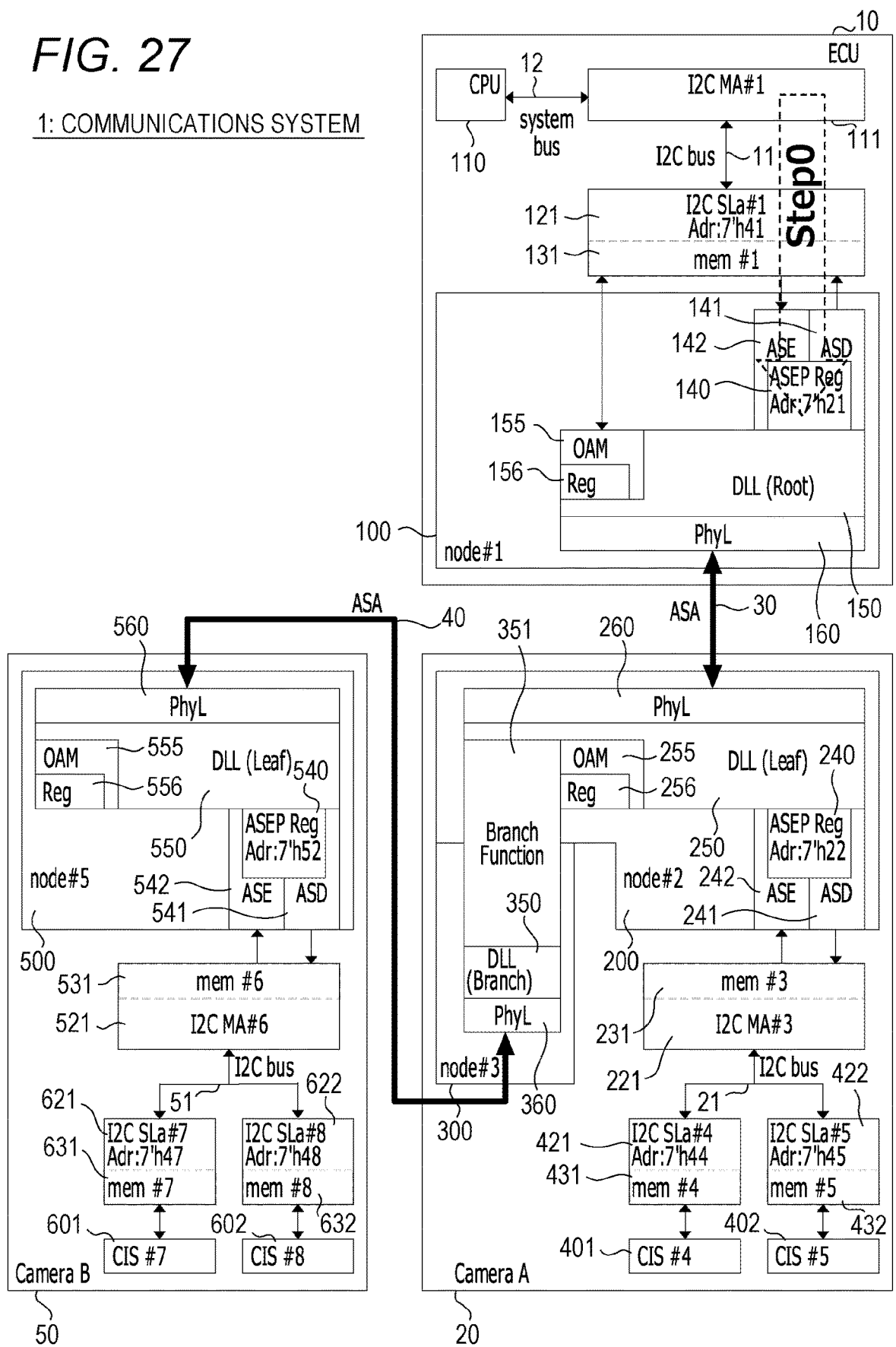
FIG. 27 is an explanatory diagram illustrating a processing operation of an information processing device according to the second embodiment.
Figure 28:
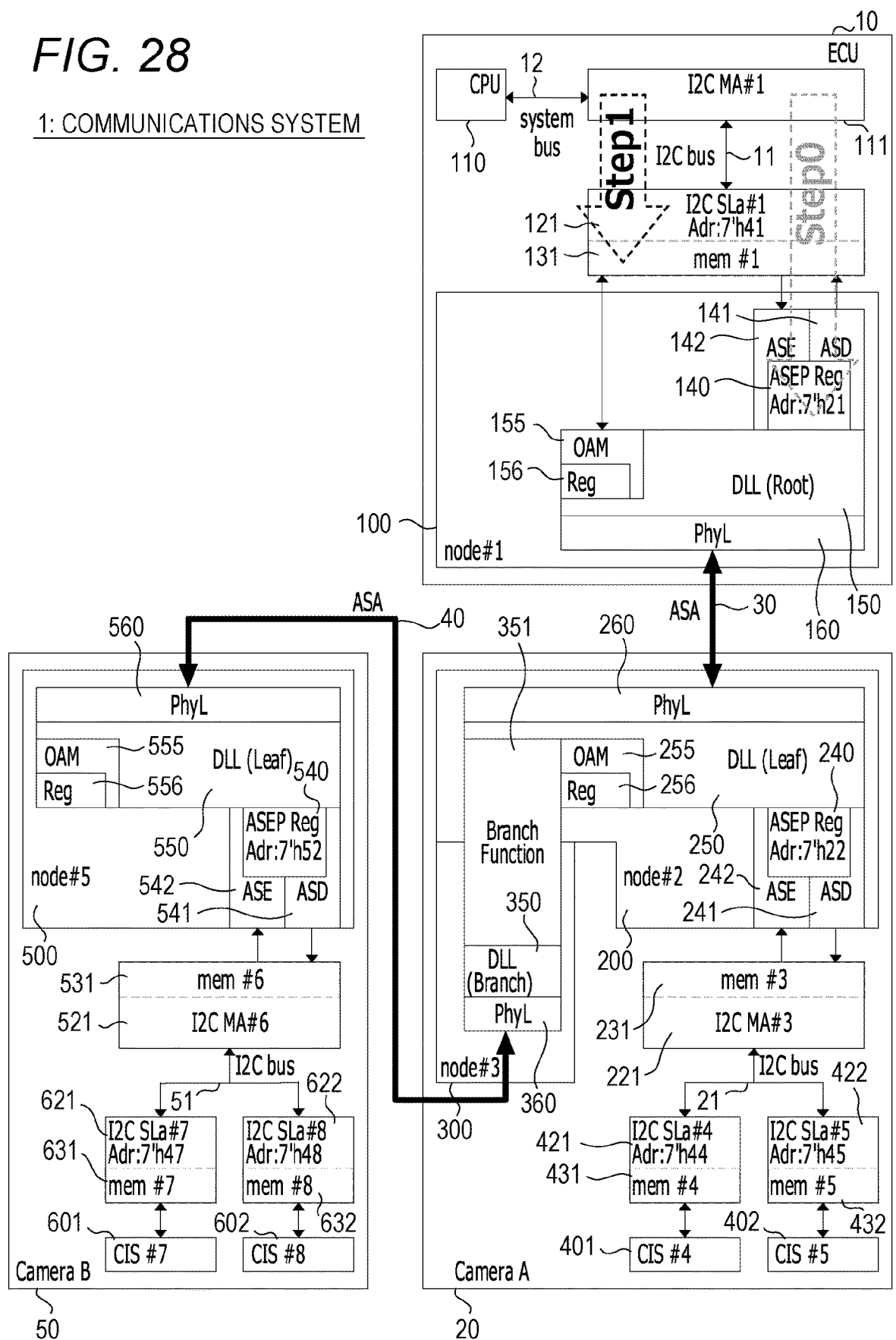
FIG. 28 is an explanatory diagram illustrating a processing operation subsequent to FIG. 27.
Figure 29:
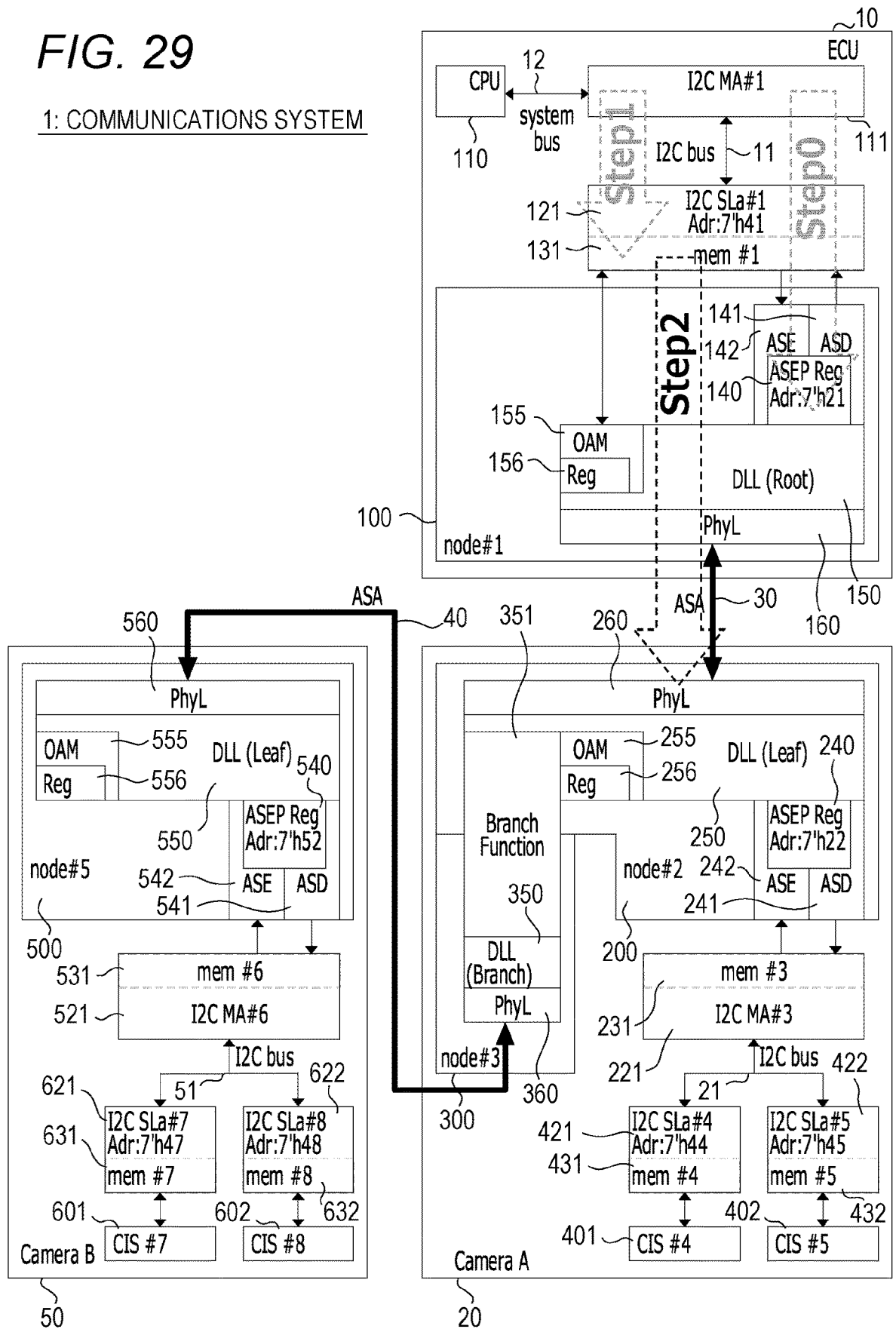
FIG. 29 is an explanatory diagram illustrating a processing operation subsequent to FIG. 28.

FIGS. 27 to 29 are explanatory diagrams each illustrating a processing operation of the information processing device according to the second embodiment. FIGS. 27 to 29 illustrate Steps 0 to 2, in the execution order, of the processing in the information processing device.

Figure 30:
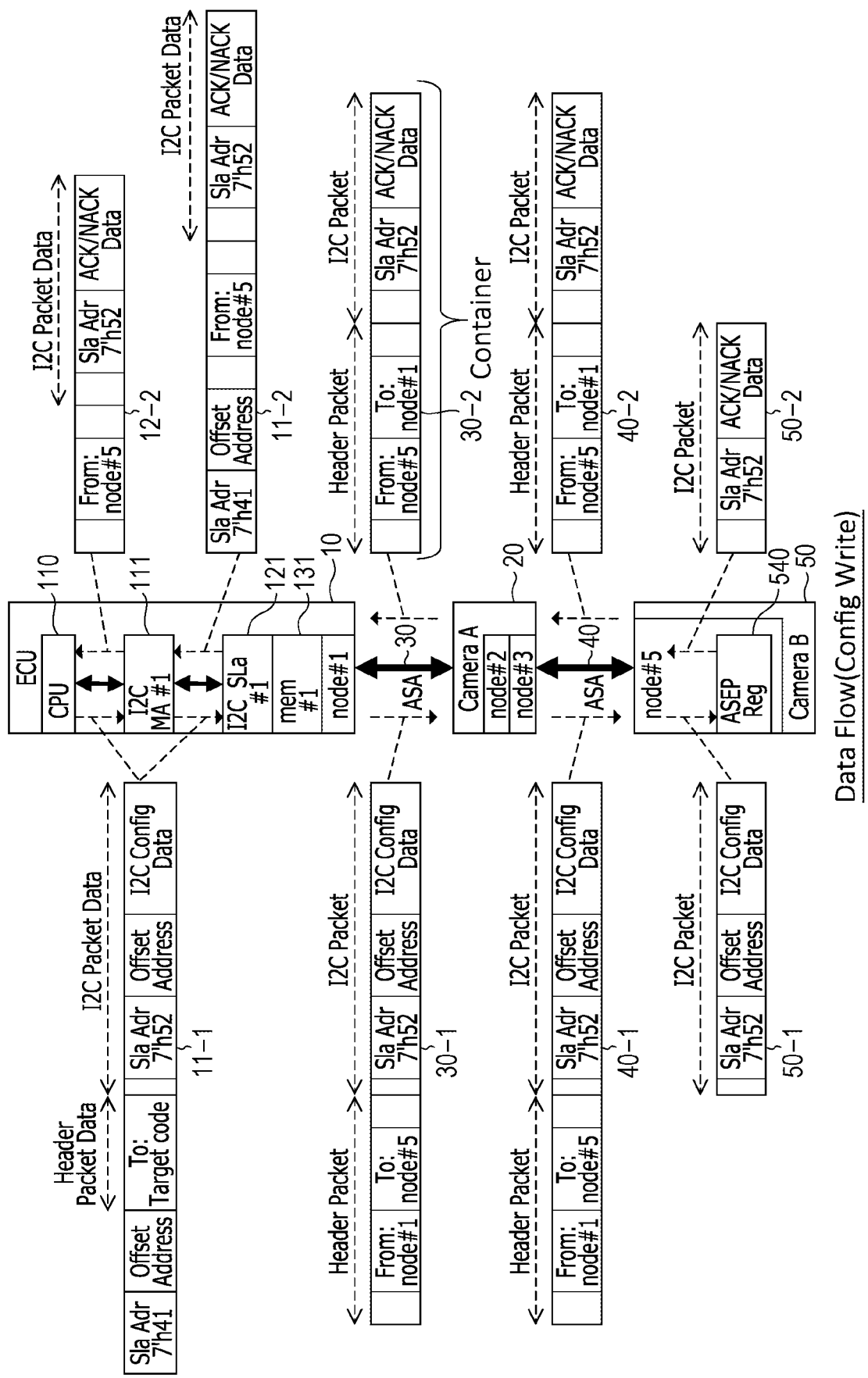
FIG. 30 is a data flow diagram illustrating writing of I2C Configuration Data according to the second embodiment.
Figure 31:
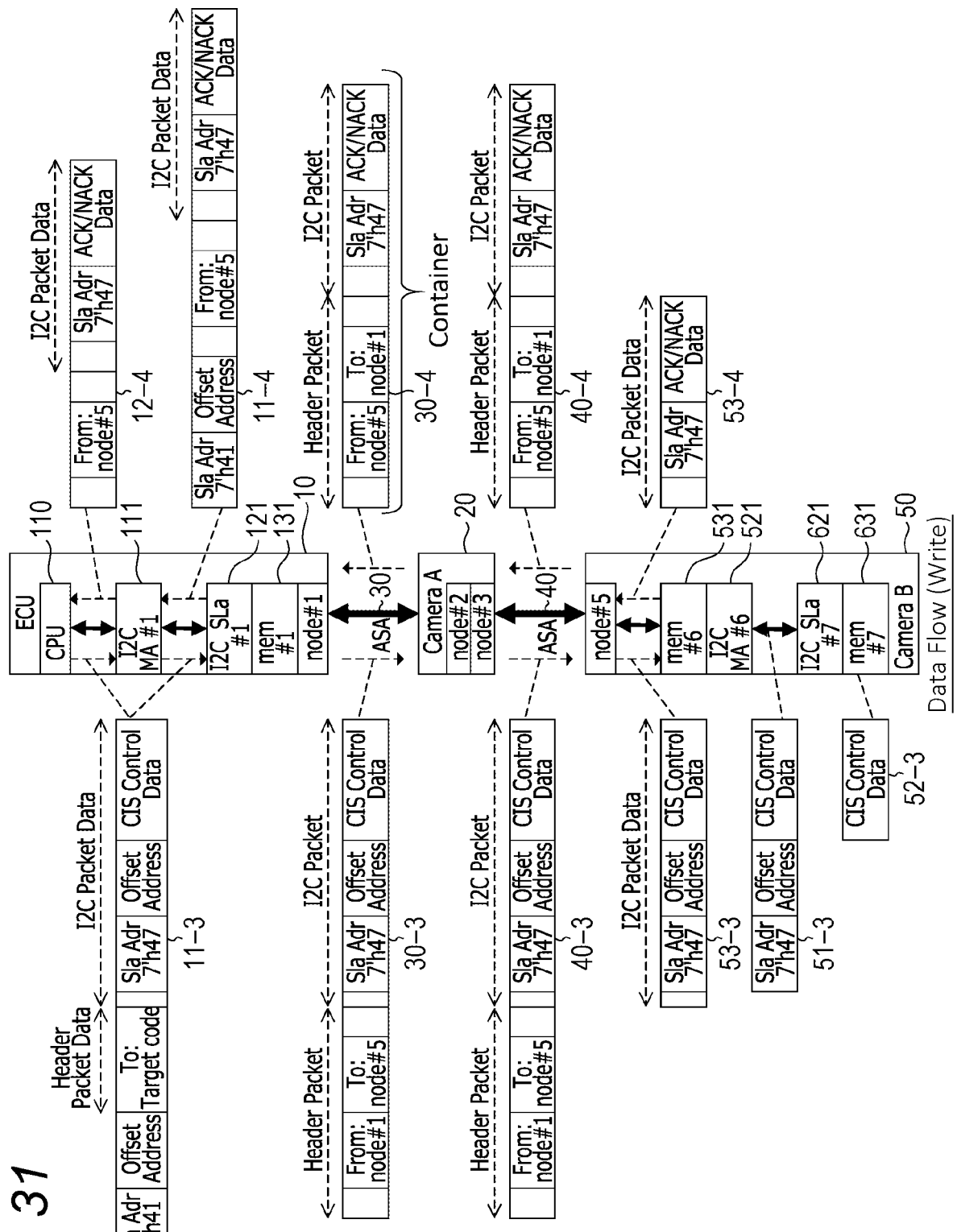
FIG. 31 is a data flow diagram illustrating writing of I2C data for controlling a CIS according to the second embodiment.

FIG. 30 is a data flow diagram illustrating writing of I2C Configuration Data according to the second embodiment. FIG. 31 is a data flow diagram illustrating writing of I2C data for controlling a CIS according to the second embodiment.

Step 0 in FIG. 27 includes three steps of processing: Steps 0-1, 0-2, 0-3, and 0-4. In Step 0-1, the CPU (110) instructs the I2C MASTER #1 (111) to write Header Packet Data ((1) in FIG. 26) of a target code (4'b0000) as a destination to the ASEP Register (140), target IDs indicating the ASA node #2 and the ASA node #5 as communication partners, and a valid flag to the Internal Memory #1 (131) of the I2C SLAVE #1 (121).

Note that I2C Packet Data ((2) in FIG. 26) of the write command includes, together with a target ID including a valid flag, a Slave Address (7'h21) and an offset address allocated to the ASEP Register (140).

In Step 0-2, the I2C MASTER #1 (111) transmits the Header Packet Data ((1) in FIG. 26) and the I2C Packet Data ((2) in FIG. 26) accompanied with a write address (0x000) for the Internal Memory #1 (131) to the Slave Address (7'h41) of the I2C SLAVE #1 (121).

In Step 0-3, the I2C SLAVE #1 (121) writes the received Header Packet Data ((1) in FIG. 26) and the I2C Packet Data ((2) in FIG. 26) to the Internal Memory #1 (131) (FIG. 26).

In Step 0-4, once the Header Packet Data is written in the Internal Memory #1 (131), the ASE (142) reads the Header Packet Data and checks the target code (4'b0000).

It can be seen from the target code that subsequent data is its own I2C Packet Data (Root (100) node).

Thereafter, once the I2C Packet Data is written in the Internal Memory #1 (131), the ASE (142) reads the I2C Packet Data, and writes the ASA node #2 (target ID1) and the ASA node #5 (target ID2) together with a valid flag from the Slave Address (7'h21) included in the I2C Packet Data to the offset address (209) of the ASEP Register (140).

Note that, if a field of the offset address (210) becomes 16'h0000 by initialization, writing may be unnecessary.

In the second embodiment, the CPU (110) in the ECU (10) gains access to the Internal Memory #1 (131) via the I2C Master (111) and the I2C Slave (121). The Internal Memory #1 (131) is a memory map shared by ASA nodes (FIG. 26).

For example, in a case where the ECU (10) transmits control data of the CIS #7 (601) built in the Camera B (50) to the Internal memory #7 (631) through the I2C communication, after Step 0, the CPU (110) needs to write I2C Configuration Data including the I2C CLK rate of the I2C bus (51) of the Camera B (50) and the Slave Address handled by the ASA node #5 (500) and having an offset address length of a flag (8 bits/16 bits), in the ASEP Register (540) (FIG. 2).

Step 1 in FIG. 28 includes three steps of processing: Steps 1-1, 1-2, and 1-3. In Step 1-1, the CPU (110) instructs the I2C MASTER #1 (111) to write Header Packet Data ((1) in FIG. 26) including a target code indicating a destination to the ASEP Register (540) and I2C Packet Data ((2) in FIG. 26) including I2C Configuration Data to the Internal Memory #1 (131) of the I2C SLAVE #1 (121) ((11-1) in FIG. 30).

Note that the I2C Configuration Data to the ASEP Register (540) includes the I2C CLK rate of the I2C bus (51), a Slave Address (7'h47) managed by the ASA node #5 (500), and flag information (8 bits/16 bits) indicating the offset address length thereof.

In Step 1-2, the I2C MASTER #1 (111) transmits the Header Packet Data and the I2C Packet Data accompanied with a write address (0x000) for the Internal Memory #1 (131) to the Slave Address (7'h41) of the I2C SLAVE #1 (121) ((11-1) in FIG. 30).

In Step 1-3, the I2C SLAVE #1 (121) writes the received Header Packet Data and the I2C Packet Data to the Internal Memory #1 (131).

Step 2 in FIG. 29 includes three steps of processing: Steps 2-1, 2-2, and 2-3. In Step 2-1, once the Header Packet Data is written in the Internal Memory #1 (131), the ASE (142) reads the Header Packet Data.

The ASE (142) transmits a target ID of a valid communication partner written from a target code (Table 2-1) specified by the Header Packet to the ASEP Register (140), to the DLL (150) as the Header Packet Data after conversion.

Thereafter, once the I2C Packet Data is written in the Internal Memory #1 (131), the ASE (142) reads the I2C Packet Data, converts the I2C Packet Data into the I2C Packet for the ASA, and transmits the I2C Packet to the DLL (150).

In the second embodiment, data of a target ID2 of the ASEP Register (140) written in Step 0 is read from the target code (4'b0010) received by the ASE (142).

If en_flag of the target ID2 is enabled (1'b1), the ASE (142) transmits data (ASA node #5) of the target ID2 to the DLL (150) as the Header Packet Data after conversion.

Thereafter, once the I2C Packet Data is written in the Internal Memory #1 (131), the ASE (142) reads the I2C Packet Data, converts the I2C Packet Data into the I2C Packet for the ASA, and transmits the I2C Packet to the DLL (150).

In a case of a target code indicating a plurality of target IDs, a plurality of specified ASA nodes # is transmitted to the DLL (150) as the Header Packet Data after conversion.

As described above, the target code (FIG. 25) of the second embodiment can more efficiently transmit the Header Packet Data ((1) in FIG. 17) of the first embodiment.

In Step 2-2, the DLL (150) generates a Header Packet from the Header Packet Data after conversion received from the ASE (142) and its own ASA node #.

In addition, the DLL (150) adds the generated Header Packet to the I2C Packet received from the ASE (142), and transmits the Container (30-1) illustrated in FIG. 14 to the PhyL (160).

In Step 2-3, the PhyL (160) transmits the Container (30-1) illustrated in FIG. 14 to the opposite ASA node #2 (200) via the ASA (30).

Step 3 to Step 16 in the second embodiment are identical to Step 3 to Step 16 in the first embodiment, and thus, the explanation thereof is omitted.

As described above, in the second embodiment, since a target code that is bit-string data having a fixed length is used as the Header Packet Data stored in the Internal Memory, it is possible to specify a combination of a plurality of target IDs with a storage capacity smaller than that of the Header Packet Data in the first embodiment. Therefore, the amount of data communication between the I2C Master and the I2C Slave in the Root (100) can be reduced, and the storage capacity of the Internal Memory can be reduced as compared with the first embodiment.

Third Embodiment

Figure 32:
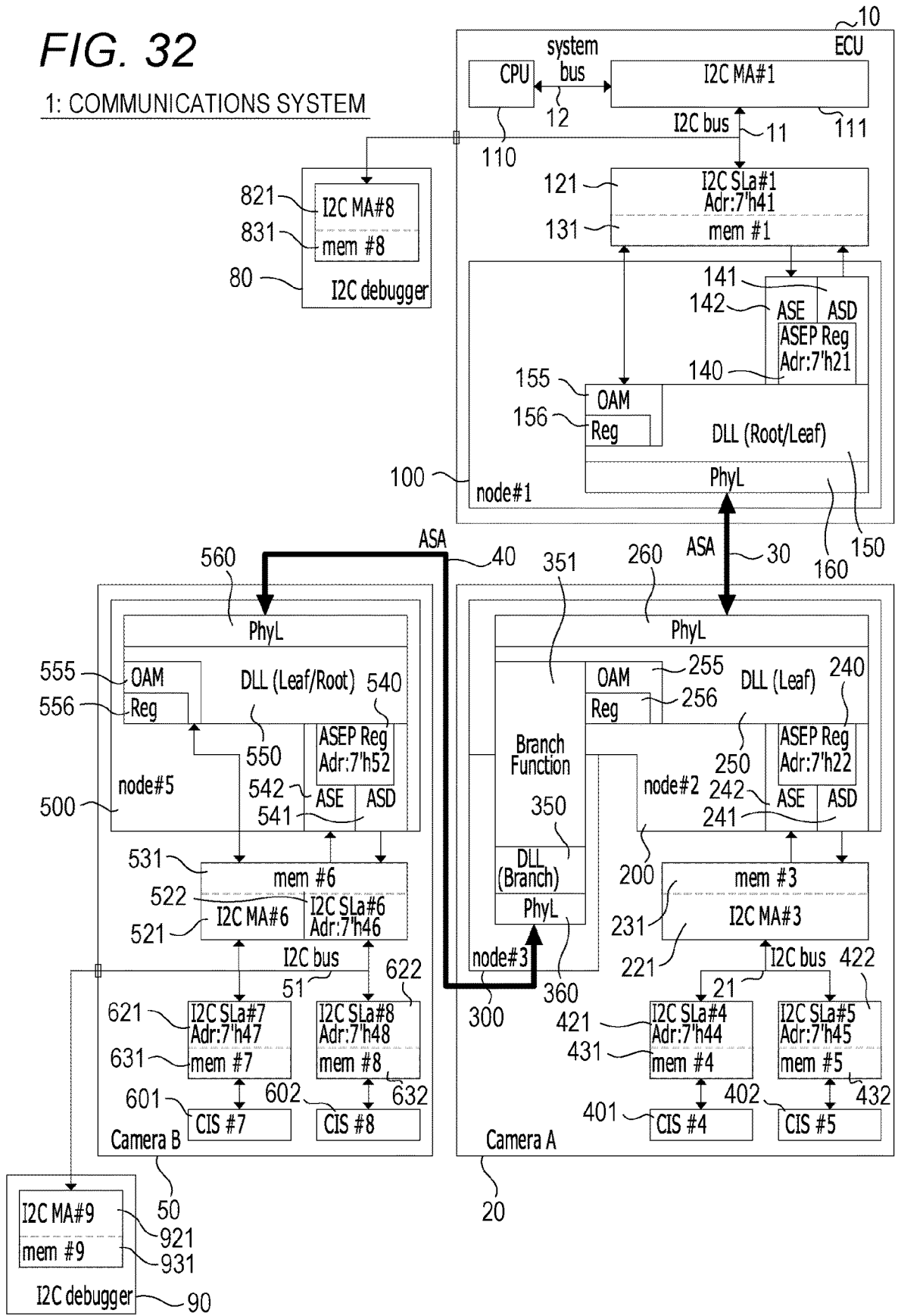
FIG. 32 is a block diagram illustrating a schematic configuration of a communication system applicable to the first and second embodiments.

FIG. 32 is a block diagram illustrating a schematic configuration of a communication system applicable to the first and second embodiments mentioned above.

Hereinafter, differences from the communication system in FIG. 16 will be mainly described.

The communication system in FIG. 32 has a Multi-Master configuration in which an I2C master (821) of an I2C debugger (80) is connected to an I2C bus of the ECU (10).

Similarly to the ECU (10), the I2C debugger (80) can perform I2C communication with the Camera A (20) and the Camera B (50) via the ASA (30).

In addition, the communication system in FIG. 32 has a Multi-Master configuration in which an I2C master (921) of an I2C debugger (90) is connected to an I2C bus of the Camera B (50).

In the communication system of FIG. 32, an investigation can be performed by an I2C debugger also from the camera side which is relatively easily connectable, but an I2C Slave (522) is also necessary in order for an I2C Master (921) of the I2C debugger (90) to communicate with an I2C device in another ASA node via the ASA (40).

Therefore, in a case where the ASA node #1 (100) side is the Root (100), the ASA node #5 (500) is the Leaf (200), and thus, the information in FIG. 2 is written in the ASEP Reg (540).

On the other hand, in a case where the I2C debugger (90) is connected to the Camera B (50), and the I2C Master (921) serves as a Master to communicate with another I2C device in the ASA node, the ASA node #5 (500) serves as the Root (100), and the ASA node #1 serves as the Leaf (500). Therefore, information in FIG. 24 is also written in the ASEP Reg (540).

FIG. 33 is a diagram illustrating a part of information stored in the ASEP Register (I2C Address Register) of the Root according to the third embodiment. FIG. 33 illustrates an example in which the target ID1 to the target ID4 are stored for each of a plurality of groups.

More specifically, FIG. 33 illustrates an example in which a target ID1 and a target ID2 of a Group #0 are stored in the Offset Address (209), a target ID3 and a target ID4 of the Group #0 are stored in the Offset Address (210), a target ID1 and a target ID2 of a Group #1 are stored in an Offset Address (211), and a target ID3 and a target ID4 of the Group #1 are stored in an Offset Address (212).

FIG. 34 is a diagram illustrating a correspondence relation between a Group number, a target code [3:0], and a target ID [1:4]. There are 16 types of target codes [3:0], and combinations of the target ID1 to the target ID4 corresponding to respective target codes are provided for each Group.

In the second embodiment, in a case where communication is established with a target ID which is not registered in the I2C Address Register, it is necessary to rewrite data of the target ID.

On the other hand, the I2C Address Register (FIG. 33) of the third embodiment stores therein the target ID1 to the target ID4 for each Group. Therefore, in a target code [7:0] illustrated in FIG. 34 of the third embodiment, a target code [7:4] that is information for identifying a Group is added to the target code [3:0] of the second embodiment.

According to FIGS. 33 and 34, in the third embodiment, by firstly registering the target ID1 to the target ID4 of a plurality of Groups, the number of unregistered target IDs decreases, and the frequency of rewriting the unregistered target IDs can be reduced.

FIGS. 33 and 34 illustrate examples in which two Groups are provided, but in the third embodiment, 64 target IDs at a maximum in 16 Groups at a maximum can be registered in the ASEP Register (140). According to FIGS. 33 and 34, in the third embodiment, by firstly registering the target ID1 to the target ID4 of a plurality of Groups, the number of unregistered target IDs decreases, and the frequency of rewriting the unregistered target IDs can be reduced.

Figure 35:
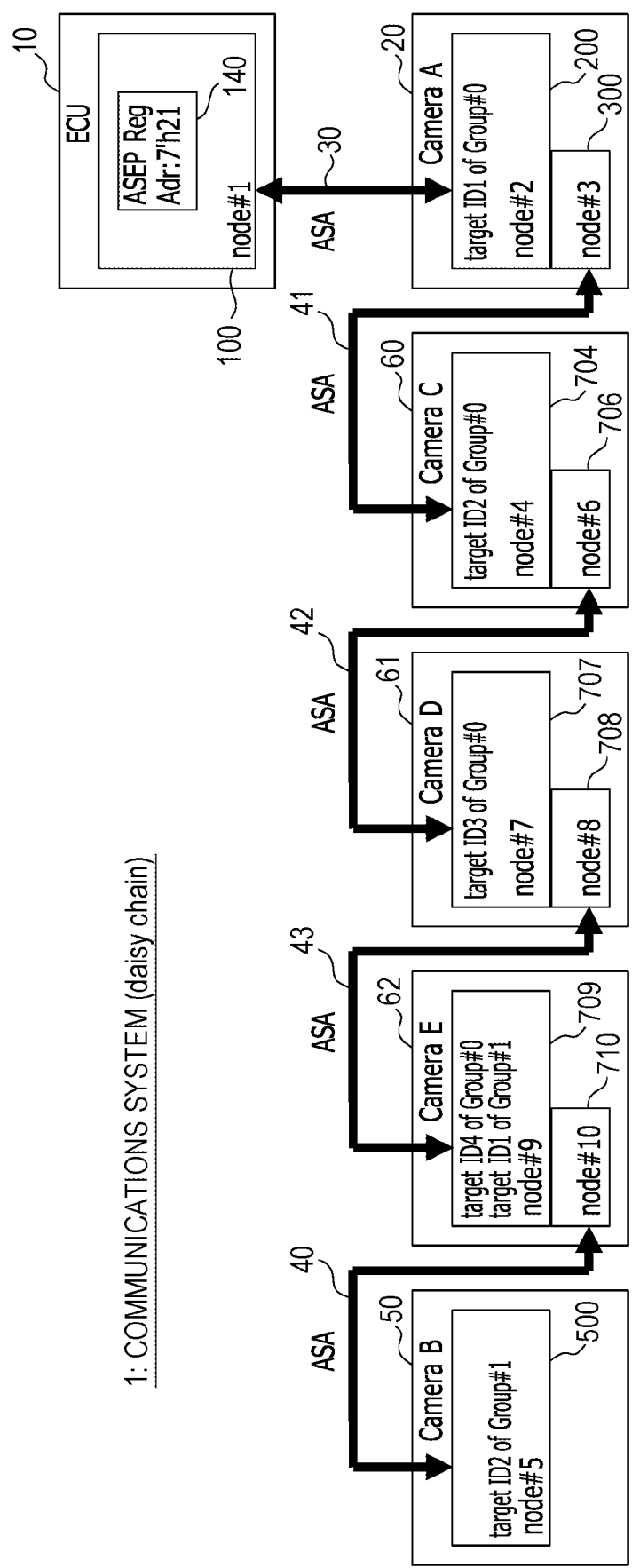
FIG. 35 is a block diagram illustrating a configuration of connecting a plurality of cameras between a Camera A and a Camera B in FIG. 29 by a daisy chain.

FIG. 35 is a block diagram illustrating a configuration of connecting a plurality of Cameras (60, 61, 62) between the Camera A (20) and the Camera B (50) in FIG. 29 by a daisy chain.

FIG. 36 is a diagram illustrating an I2C Address Register corresponding to the configuration of FIG. 35. A target ID corresponding to a target code of the Group #0 is stored in the Offset Address (209) and (210), and a target ID corresponding to a target code of the Group #1 is stored in the Offset Address (211) and (212). More specifically, the Offset Address (209) stores therein a target ID of the ASA node #2, a target ID of the ASA node #4, and information indicating that these target IDs are enabled. The Offset Address (210) stores therein a target ID of the ASA node #7, a target ID of the ASA node #9, and information indicating whether these target IDs are enabled or disabled. The Offset Address (211) stores therein a target ID of the ASA node #9, a target ID of the ASA node #5, and information indicating that these target IDs are enabled. In the Offset Address (212), information (disabled in FIG. 36) about a target ID3 of the Group #1 and a target ID4 of the Group #1 is stored.

In the configuration of FIG. 35, if the target code [7:0] of FIG. 34 issued by the ECU (10) is 8'h01, the ASA node #1 (100) generates Header Packet Data including the ASA node #2. In a case of 8'h03, the ASA node #1 (100) generates Header Packet Data including the ASA nodes #2 and #4. In a case of 8'h11, the ASA node #1 (100) generates Header Packet Data including the ASA node #9.

In a case of 8'h13, the ASA node #1 (100) generates Header Packet Data including the ASA nodes #9 and #5.

As described above, for example, the Leaf (500) causes the first I2C communication instrument (111, 121) and the second I2C communication instrument (221, 421, 422, 521, 621, 622) to establish communication therebetween on the basis of the I2C Configuration Data transmitted from the communication partner device (ASA node #1 (100)) to which the first I2C communication instrument (111, 121) is connected.

The ASA node #5 (500) according to the third embodiment includes an encoder (242, 542), a communication unit (221, 421, 422, 521, 621, 622), and a decoder (241, 541).

The encoder (242, 542) generates Header Packet Data including a target ID of the communication partner device (100) and I2C Packet Data including a slave address and an offset address of the first I2C communication instrument (111, 121). The communication unit (221, 421, 422, 521, 621, 622) transmits a transmission packet including Header Packet Data and I2C Packet Data generated by the encoder (242, 542) to the communication partner device (100) by a Time Division Duplex (TDD) communication scheme, and receives a reception packet from the communication partner device (100) via the TDD communication scheme. The decoder (241, 541) generates I2C Packet Data from the reception packet.

As described above, in the third embodiment, the second I2C communication instrument (221, 421, 422, 521, 621, 622) further includes the I2C Slave unit (522) to which the I2C Master unit (921) is connected via the I2C bus.

Therefore, if necessary, it is possible to cause the ASA node (200) or (500) to operate as a Root, and cause the ASA node #1 (100) to operate as a Leaf. In addition, in the third embodiment, the plurality of second communication devices is connected by a daisy chain, and the Header Packet Data includes a Group number indicating a Group and a bit string specifying a combination of a plurality of target IDs. Therefore, the Root (100) can establish I2C communication with an I2C communication instrument included in each of the plurality of Leaves (200, 500). Moreover, it is possible to cause any of the plurality of Leaves connected by a daisy chain to operate as a Root.

Note that the present technology can have the following configurations.

(1) A communication device configured to cause a first I2C communication instrument and a second I2C communication instrument connected to a communication partner device to establish communication therebetween, the communication device including:
an encoder that generates Header Packet Data including a target ID of the communication partner device and I2C Packet Data including a slave address and an offset address of the second I2C communication instrument;
a communication unit that transmits a transmission packet including the Header Packet Data and the I2C Packet Data generated by the encoder to the communication partner device by a Time Division Duplex (TDD) communication scheme and receives a reception packet from the communication partner device by the TDD communication scheme; and
a decoder that generates the I2C Packet Data from the reception packet.

(2) The communication device according to (1), in which the Header Packet Data includes a plurality of the target IDs corresponding to a plurality of the communication partner devices.

(3) The communication device according to (2), in which a memory space which stores therein the Header Packet Data and the I2C Packet Data includes a memory space for communication with the communication partner device.

(4) The communication device according to (2) or (3), in which the Header Packet Data includes four of the target IDs compliant with Automotive SerDes Alliance (ASA) standards.

(5) The communication device according to any one of (2) to (4), in which the encoder and the decoder are provided so as to be shared by the plurality of the communication partner devices corresponding to the plurality of the target IDs.

(6) The communication device according to any one of (2) to (5), in which a memory which stores therein the Header Packet Data and the I2C Packet Data has a plurality of memory spaces each having a fixed length to store therein the plurality of the target IDs included in the Header Packet Data, and an invalid ID is stored in the memory space corresponding to the target ID that is unused.

(7) The communication device according to any one of (2) to (5), in which the Header Packet Data includes variable-length data which includes information indicating the number of the target IDs that are valid, and in which the target IDs that are valid are arranged after the information.

(8) The communication device according to (1), in which the Header Packet Data includes a target code which specifies a combination of the plurality of the target IDs.

(9) The communication device according to (8), in which the target code includes bit-string data having a fixed length.

(10) The communication device according to (9), in which the target code includes 4-bit data and specifies a combination of four of the target IDs.

(11) The communication device according to any one of (1) to (10), in which a memory which stores therein the Header Packet Data and the I2C Packet Data stores, as the I2C Packet Data, at least either one of I2C Configuration Data including an operation setting of the second I2C communication instrument or I2C Data for the second I2C communication instrument.

(12) A communication system including:
a first communication device to which a first I2C communication instrument is connected; and
a second communication device to which a second I2C communication instrument is connected, and which alternately transmits and receives information within an allocated period to and from the first communication device by a Time Division Duplex (TDD) communication scheme, in which
the first communication device includes
a first encoder that generates Header Packet Data including a target ID of the second communication device and I2C Packet Data including a slave address and an offset address of the second I2C communication instrument,
a communication unit that transmits a transmission packet including the Header Packet Data and the I2C Packet Data generated by the first encoder to the second communication device by a Time Division Duplex (TDD) communication scheme and receives a reception packet from the second communication device by the TDD communication scheme; and
a first decoder that generates the I2C Packet Data from the reception packet.

(13) The communication system according to (12), in which the second communication device includes:

a second encoder that generates Header Packet Data including a target ID of the first communication device and I2C Packet Data including a slave address and an offset address of the first I2C communication instrument;

a communication unit that transmits a transmission packet including the Header Packet Data and the I2C Packet Data generated by the second encoder to the first communication device by a Time Division Duplex (TDD) communication scheme and receives a reception packet from the first communication device by the TDD communication scheme; and a second decoder that generates the I2C Packet Data from the reception packet.

(14) The communication system according to (13), in which the second I2C communication instrument further includes an I2C Slave unit to which an I2C Master unit is connected via an I2C bus.

(15) The communication system according to (13) or (14), in which a plurality of the second communication devices is connected by a daisy chain, and the Header Packet Data is divided into a plurality of Groups, and each Group includes a plurality of the target IDs compliant with Automotive SerDes Alliance (ASA) standards.

(16) The communication system according to (13) or (14), in which a plurality of the second communication devices is connected by a daisy chain, and the Header Packet Data includes a Group number indicating a Group and a bit string that specifies a combination of a plurality of the target IDs.

(17) A communication device configured to cause a first I2C communication instrument and a second I2C communication instrument to establish communication therebetween on the basis of I2C Configuration Data transmitted from a communication partner device to which the first I2C communication instrument is connected, the communication device including:

an encoder that generates Header Packet Data including a target ID of the communication partner device and I2C Packet Data including a slave address and an offset address of the first I2C communication instrument; a communication unit that transmits a transmission packet including the Header Packet Data and the I2C Packet Data generated by the encoder to the communication partner device by a Time Division Duplex (TDD) communication scheme and receives a reception packet from the communication partner device by the TDD communication scheme; and a decoder that generates the I2C Packet Data from the reception packet, in which the second I2C communication instrument further includes an I2C Slave unit to which an I2C Master unit is connected via an I2C bus.

The modes of the present disclosure are not limited to the above-described individual embodiments, and include various modifications that could be conceived of by those skilled in the art. In addition, the effects of the present disclosure are not limited to the effects described above. That is, various additions, modifications, and partial deletions can be made without departing from the conceptual idea and gist of the present disclosure derived from the contents defined in the claims and equivalents thereof.

REFERENCE SIGNS LIST

10 ECU
11 I2C bus
12 System bus
20 Camera
21 I2C bus
30 ASA
40 ASA
50 Camera
51 I2C bus
80 I2C debugger
90 I2C debugger
100 ASA node
111 I2C Master
121 I2C Slave
131 Internal Memory
140 ASEP Register
141 Application Stream Deencapsulator
142 Application Stream Encapsulator
150 Data Link Layer (Root/Leaf)
155 Operations, Administration, Maintenance
156 Register
160 Physical Layer
200 ASA node
221 I2C Master
231 Internal Memory
240 ASEP Register
241 Application Stream Deencapsulator
242 Application Stream Encapsulator
250 Data Link Layer (Leaf)
255 Operations, Administration, Maintenance
256 Register
260 Physical Layer
300 ASA node
350 Data Link Layer (Branch)
351 Branch Function Unit
360 Physical Layer
401 CMOS Image Sensor
402 CMOS Image Sensor
421 I2C Slave
422 I2C Slave
431 Internal Memory
432 Internal Memory
500 ASA node
521 I2C Master
522 I2C Slave
531 Internal Memory
540 ASEP Register
541 Application Stream Deencapsulator
542 Application Stream Encapsulator
550 Data Link Layer (Root/Leaf)
555 Operations, Administration, Maintenance
556 Register
560 Physical Layer
601 CMOS Image Sensor
602 CMOS Image Sensor
621 I2C Slave
622 I2C Slave
631 Internal Memory
632 Internal Memory
821 I2C Master
831 Internal Memory
921 I2C Master
931 Internal Memory

The invention claimed is:

1. A communication device configured to cause a first I2C communication instrument and a second I2C communication instrument connected to a communication partner device to establish communication therebetween, the communication device comprising:

an encoder that generates Header Packet Data including a target ID of the communication partner device and I2C Packet Data including a slave address and an offset address of the second I2C communication instrument;

a communication unit that transmits a transmission packet including the Header Packet Data and the I2C Packet Data generated by the encoder to the communication partner device by a Time Division Duplex (TDD) communication scheme and receives a reception packet from the communication partner device by the TDD communication scheme; and a decoder that generates the I2C Packet Data from the reception packet, wherein the target ID is one of a plurality of target IDs, the communication partner device is one of a plurality of communication partner devices, the Header Packet Data includes the plurality of target IDs respectively corresponding to the plurality of communication partner devices.

2. The communication device according to claim 1, wherein a memory space which stores therein the Header Packet Data and the I2C Packet Data includes a memory space for communication with the communication partner device.

3. The communication device according to claim 1, wherein the Header Packet Data includes four of the target IDs compliant with Automotive SerDes Alliance (ASA) standards.

4. The communication device according to claim 1, wherein the encoder and the decoder are provided so as to be shared by the plurality of the communication partner devices corresponding to the plurality of the target IDs.

5. The communication device according to claim 1, wherein a memory which stores therein the Header Packet Data and the I2C Packet Data has a plurality of memory spaces each having a fixed length to store therein the plurality of the target IDs included in the Header Packet Data, and an invalid ID is stored in the memory space corresponding to the target ID that is unused.

6. The communication device according to claim 1, wherein the Header Packet Data comprises variable-length data which includes information indicating a number of the target IDs that are valid, and in which the target IDs that are valid are arranged after the information.

7. A communication device configured to cause a first I2C communication instrument and a second I2C communication instrument connected to a communication partner device to establish communication therebetween, the communication device comprising:

an encoder that generates Header Packet Data including a target ID of the communication partner device and I2C Packet Data including a slave address and an offset address of the second I2C communication instrument;

a communication unit that transmits a transmission packet including the Header Packet Data and the I2C Packet Data generated by the encoder to the communication partner device by a Time Division Duplex (TDD) communication scheme and receives a reception packet from the communication partner device by the TDD communication scheme; and a decoder that generates the I2C Packet Data from the reception packet, wherein the target ID is one of a plurality of target IDs, and the Header Packet Data includes a target code which specifies a combination of the plurality of target IDs.

8. The communication device according to claim 7, wherein the target code comprises bit-string data having a fixed length.

9. The communication device according to claim 8, wherein the target code comprises 4-bit data and specifies a combination of four of the target IDs.

10. A communication device configured to cause a first I2C communication instrument and a second I2C communication instrument connected to a communication partner device to establish communication therebetween, the communication device comprising:

an encoder that generates Header Packet Data including a target ID of the communication partner device and I2C Packet Data including a slave address and an offset address of the second I2C communication instrument;

a communication unit that transmits a transmission packet including the Header Packet Data and the I2C Packet Data generated by the encoder to the communication partner device by a Time Division Duplex (TDD) communication scheme and receives a reception packet from the communication partner device by the TDD communication scheme; and a decoder that generates the I2C Packet Data from the reception packet, wherein a memory which stores therein the Header Packet Data and the I2C Packet Data stores, as the I2C Packet Data, at least either one of I2C Configuration Data including an operation setting of the second I2C communication instrument or I2C Data for the second I2C communication instrument.

11. A communication system comprising:

a first communication device to which a first I2C communication instrument is connected; and a second communication device to which a second I2C communication instrument is connected, and which alternately transmits and receives information within an allocated period to and from the first communication device by a Time Division Duplex (TDD) communication scheme, wherein the first communication device includes a first encoder that generates Header Packet Data including a target ID of the second communication device and I2C Packet Data including a slave address and an offset address of the second I2C communication instrument, a communication unit that transmits a transmission packet including the Header Packet Data and the I2C Packet Data generated by the first encoder to the second communication device by a Time Division Duplex (TDD) communication scheme and receives a reception packet from the second communication device by the TDD communication scheme, and a first decoder that generates the I2C Packet Data from the reception packet; and wherein the second communication device includes a second encoder that generates Header Packet Data including a target ID of the first communication device and I2C Packet Data including a slave address and an offset address of the first I2C communication instrument, a communication unit that transmits a transmission packet including the Header Packet Data and the I2C Packet Data generated by the second encoder to the first communication device by a Time Division Duplex (TDD) communication scheme and receives a reception packet from the first communication device by the TDD communication scheme, and a second decoder that generates the I2C Packet Data from the reception packet.

12. The communication system according to claim 11, wherein the second I2C communication instrument further includes an I2C Slave unit to which an I2C Master unit is connected via an I2C bus.

13. The communication system according to claim 11, wherein
a plurality of the second communication devices is connected by a daisy chain, and
the Header Packet Data is divided into a plurality of Groups, and each Group includes a plurality of the target IDs compliant with Automotive SerDes Alliance (ASA) standards.

14. The communication system according to claim 11, wherein
a plurality of the second communication devices is connected by a daisy chain, and
the Header Packet Data includes a Group number indicating a Group and a bit string that specifies a combination of a plurality of the target IDs.

15. A communication device configured to cause a first I2C communication instrument and a second I2C communication instrument to establish communication therebetween on a basis of I2C Configuration Data transmitted from a communication partner device to which the first I2C communication instrument is connected, the communication device comprising:
an encoder that generates Header Packet Data including a target ID of the communication partner device and I2C Packet Data including a slave address and an offset address of the first I2C communication instrument;
a communication unit that transmits a transmission packet including the Header Packet Data and the I2C Packet Data generated by the encoder to the communication partner device by a Time Division Duplex (TDD) communication scheme and receives a reception packet from the communication partner device by the TDD communication scheme; and
a decoder that generates the I2C Packet Data from the reception packet, wherein
the second I2C communication instrument further includes an I2C Slave unit to which an I2C Master unit is connected via an I2C bus.

* * * * *